US008924103B2

(12) United States Patent
Dammeyer et al.

(10) Patent No.: US 8,924,103 B2
(45) Date of Patent: Dec. 30, 2014

(54) MATERIALS HANDLING VEHICLE ESTIMATING A SPEED OF A MOVABLE ASSEMBLY FROM A LIFT MOTOR SPEED

(71) Applicant: Crown Equipment Corporation, New Bremen, OH (US)

(72) Inventors: Karl L. Dammeyer, St. Marys, OH (US); Eric D. Holbrook, Findley, OH (US); Darrin R. Ihle, Sidney, OH (US); Marc A. McClain, St. Marys, OH (US); Lucas B. Waltz, Coldwater, OH (US)

(73) Assignee: Crown Equipment Corporation, New Bremen, OH (US)

( * ) Notice: Subject to any disclaimer, the term of this patent is extended or adjusted under 35 U.S.C. 154(b) by 0 days.

(21) Appl. No.: 14/333,895

(22) Filed: Jul. 17, 2014

(65) Prior Publication Data

US 2014/0326541 A1 Nov. 6, 2014

Related U.S. Application Data

(62) Division of application No. 13/371,789, filed on Feb. 13, 2012.

(60) Provisional application No. 61/443,302, filed on Feb. 16, 2011, provisional application No. 61/560,480, filed on Nov. 16, 2011.

(51) Int. Cl.

| | |
|---|---|
| ***G06F 7/70*** | (2006.01) |
| ***G06F 19/00*** | (2011.01) |
| ***G06G 7/00*** | (2006.01) |
| ***G06G 7/76*** | (2006.01) |
| ***B66F 9/22*** | (2006.01) |
| ***B66F 9/07*** | (2006.01) |
| ***B66F 9/08*** | (2006.01) |

(52) U.S. Cl.

CPC ... *B66F 9/22* (2013.01); *B66F 9/07* (2013.01); *B66F 9/087* (2013.01)

USPC ................. 701/50; 701/36; 701/49; 414/589; 414/603; 414/605; 414/664; 414/685

(58) Field of Classification Search

CPC ...... B66F 17/00; B66F 17/003; B66F 17/006; B66F 9/22; B66F 9/20; B66F 9/205; B66F 9/24

USPC ............ 701/23, 28, 36, 49, 50; 414/589, 592, 414/603, 605, 664, 668, 669, 685, 814

See application file for complete search history.

(56) References Cited

U.S. PATENT DOCUMENTS 3,263,574 A 8/1966 Tennis
3,709,331 A 1/1973 Smith, Jr.

(Continued)

FOREIGN PATENT DOCUMENTS

AU 2005286765 B2 3/2006
DE 3414793 A1 10/1984

(Continued)

OTHER PUBLICATIONS

Notice of Opposition to European Patent 1828045; filed by BT Products AB; Sep. 23, 2009.

(Continued)

*Primary Examiner* — Rami Khatib

(74) *Attorney, Agent, or Firm* — Stevens & Showalter, LLP

(57) ABSTRACT

A materials handling vehicle is provided including: a support structure including a fixed member; a movable assembly coupled to the support structure; a hydraulic system; and a control system. The support structure further includes lift apparatus to effect movement of the movable assembly relative to the support structure fixed member. The lift apparatus includes at least one ram/cylinder assembly. The hydraulic system includes a motor, a pump coupled to the motor to supply a pressurized fluid to the at least one ram/cylinder assembly, and at least one electronically controlled valve associated with the at least one ram/cylinder assembly. The control structure may estimate a speed of the movable assembly from a speed of the motor and calculate an updated pump volumetric efficiency using the estimated movable assembly speed and a determined movable assembly speed.

23 Claims, 15 Drawing Sheets

(56) References Cited

U.S. PATENT DOCUMENTS

| | | | |
|---|---|---|---|
| 3,843,003 | A | 10/1974 | Frank |
| 3,947,744 | A | 3/1976 | Grace et al. |
| 4,130,183 | A | 12/1978 | Tjornemark |
| 4,144,946 | A | 3/1979 | Melocik |
| 4,194,867 | A | 3/1980 | Bragg |
| 4,204,460 | A | 5/1980 | Andersen et al. |
| 4,354,568 | A | 10/1982 | Griesenbrock |
| 4,426,683 | A | 1/1984 | Kissell |
| 4,461,015 | A | 7/1984 | Kulhavy |
| 4,467,894 | A | 8/1984 | Sinclair |
| 4,485,623 | A | 12/1984 | Chichester et al. |
| 4,499,541 | A | 2/1985 | Yuki et al. |
| 4,509,127 | A | 4/1985 | Yuki et al. |
| 4,511,974 | A | 4/1985 | Nakane et al. |
| 4,517,645 | A | 5/1985 | Yuki et al. |
| 4,548,296 | A | 10/1985 | Hasegawa |
| 4,552,250 | A | 11/1985 | Luebrecht |
| 4,558,593 | A | 12/1985 | Watanabe et al. |
| 4,592,449 | A | 6/1986 | Sakata et al. |
| 4,665,698 | A | 5/1987 | Trusock |
| 4,716,990 | A | 1/1988 | Takeuchi |
| 4,742,468 | A | 5/1988 | Ohashi et al. |
| 4,781,066 | A | 11/1988 | Pope et al. |
| 4,817,760 | A | 4/1989 | Yamamura |
| 4,826,474 | A | 5/1989 | Holmes |
| 4,869,635 | A | 9/1989 | Krahn |
| 4,938,054 | A | 7/1990 | Dye et al. |
| 4,942,529 | A | 7/1990 | Avitan et al. |
| 4,943,756 | A | 7/1990 | Conley, III et al. |
| 5,011,363 | A | 4/1991 | Conley, III et al. |
| 5,022,496 | A | 6/1991 | Klopfleisch et al. |
| 5,044,472 | A | 9/1991 | Dammeyer et al. |
| 5,238,086 | A | 8/1993 | Aoki et al. |
| 5,266,115 | A | 11/1993 | Taccon et al. |
| 5,341,695 | A | 8/1994 | Avitan |
| 5,462,136 | A | 10/1995 | Schoenmaker et al. |
| 5,526,673 | A | 6/1996 | Avitan |
| 5,647,457 | A | 7/1997 | Wegdam et al. |
| 5,649,422 | A | 7/1997 | Baginski et al. |
| 5,652,486 | A | 7/1997 | Mueller et al. |
| 5,657,834 | A | 8/1997 | Plaugher et al. |
| 5,666,295 | A | 9/1997 | Bruns |
| 5,678,469 | A | 10/1997 | Lech |
| 5,680,762 | A | 10/1997 | Reid |
| 5,687,081 | A | 11/1997 | Wellman et al. |
| 5,712,618 | A | 1/1998 | McKenna |
| 5,717,588 | A | 2/1998 | Yamane et al. |
| 5,733,095 | A | 3/1998 | Palmer et al. |
| 5,748,077 | A | 5/1998 | Brandt |
| 5,794,723 | A | 8/1998 | Caneer, Jr. et al. |
| 5,816,366 | A | 10/1998 | Briday et al. |
| 5,890,563 | A | 4/1999 | Avitan et al. |
| 5,906,648 | A | 5/1999 | Zoratti et al. |
| 5,969,302 | A | 10/1999 | Nishizawa et al. |
| 5,995,001 | A | 11/1999 | Wellman et al. |
| 6,009,357 | A | 12/1999 | Wellman et al. |
| 6,135,694 | A | 10/2000 | Trego et al. |
| 6,164,415 | A | 12/2000 | Takeuchi et al. |
| 6,269,641 | B1 | 8/2001 | Dean |
| 6,269,913 | B1 | 8/2001 | Kollmannsberger et al. |
| 6,284,129 | B1 | 9/2001 | Giordano et al. |
| 6,286,629 | B1 | 9/2001 | Saunders |
| 6,293,099 | B1 | 9/2001 | Kamiya |
| 6,439,102 | B1 | 8/2002 | Matsuzaki et al. |
| 6,520,008 | B1 | 2/2003 | Stragier |
| 6,533,076 | B1 | 3/2003 | Haverfield et al. |
| 6,557,586 | B1 | 5/2003 | Lockyer et al. |
| 6,611,746 | B1 | 8/2003 | Nagai |
| 6,785,597 | B1 | 8/2004 | Farber et al. |
| 6,789,458 | B2 | 9/2004 | Schumacher et al. |
| 6,817,252 | B2 | 11/2004 | Wiklund et al. |
| 6,850,828 | B2 | 2/2005 | Chen |
| 7,028,470 | B1 | 4/2006 | Achten |
| 7,344,000 | B2 | 3/2008 | Dammeyer et al. |
| 2003/0159576 | A1 | 8/2003 | Schoonmaker et al. |
| 2003/0167114 | A1 | 9/2003 | Chen |
| 2004/0079076 | A1 | 4/2004 | Lazaro |
| 2004/0139806 | A1 | 7/2004 | Christmas |
| 2006/0060409 | A1 * | 3/2006 | Dammeyer et al. ........... 180/306 |
| 2007/0205056 | A1 | 9/2007 | Rekow et al. |
| 2009/0101447 | A1 | 4/2009 | Durham et al. |
| 2009/0114485 | A1 | 5/2009 | Eggert |
| 2009/0198371 | A1 | 8/2009 | Emanuel et al. |
| 2009/0260923 | A1 | 10/2009 | Baldini |
| 2009/0319134 | A1 | 12/2009 | Haemmerl et al. |
| 2010/0065377 | A1 | 3/2010 | Billger et al. |
| 2010/0068023 | A1 | 3/2010 | Kuck et al. |
| 2010/0176922 | A1 | 7/2010 | Schwab et al. |
| 2013/0013159 | A1 * | 1/2013 | Moriki et al. ................... 701/50 |
| 2013/0183127 | A1 * | 7/2013 | Dammeyer et al. ........... 414/592 |

FOREIGN PATENT DOCUMENTS

| | | | |
|---|---|---|---|
| DE | 4017947 | A1 | 12/1991 |
| DE | 4306680 | A1 | 9/1994 |
| DE | 19508346 | C1 | 6/1996 |
| DE | 19511591 | A1 | 10/1996 |
| DE | 19933559 | A1 | 1/2001 |
| DE | 10010670 | A1 | 9/2001 |
| DE | 10030059 | A1 | 12/2001 |
| DE | 10110700 | A1 | 9/2002 |
| EP | 0439436 | A2 | 7/1991 |
| EP | 0798260 | A2 | 10/1997 |
| EP | 1193211 | A2 | 9/2001 |
| EP | 1828045 | B1 | 12/2008 |
| GB | 1294249 | | 10/1972 |
| GB | 2094481 | A | 9/1982 |
| GB | 2196447 | A | 4/1988 |
| GB | 2360757 | A | 10/2001 |
| JP | 01168550 | A | 7/1989 |
| JP | 3003897 | A | 1/1991 |
| JP | 03098997 | A | 4/1991 |
| JP | 05131299 | A | 5/1993 |
| JP | 07237856 | A | 9/1995 |
| JP | 08156674 | A | 6/1996 |
| JP | 2004051300 | A | 2/2004 |
| JP | 2010083672 | A | 4/2010 |
| WO | 2006034375 | A2 | 3/2006 |

OTHER PUBLICATIONS

Notice of Opposition-Exhibit D1a-Invoices; cited in Opposition dated Sep. 17, 2009.

Notice of Opposition-Exhibit D1b-Invoice; cited in Opposition dated Sep. 17, 2009.

Notice of Opposition-Exhibit D1c-Receipt of payment; cited in Opposition dated Sep. 17, 2009.

Notice of Opposition-Exhibit D1d-Purchase Order; cited in Opposition dated Sep. 17, 2009.

Notice of Opposition-Exhibit D2-Service Manual for Vector; cited in Opposition dated Sep. 17, 2009.

Notice of Opposition-Exhibit D2a-pages from Service Manual; cited in Opposition dated Sep. 17, 2009.

Notice of Opposition-Exhibit D2b-pages from Service Manual; cited in Opposition dated Sep. 17, 2009.

Notice of Opposition-Exhibit D2c-pages. from Service Manual; cited in Opposition dated Sep. 17, 2009.

Notice of Opposition-Exhibit D2d-pages from Service Manual; cited in Opposition dated Sep. 17, 2009.

Notice of Opposition-Exhibit D3-Harmonized Truck Standard; cited in Opposition dated Sep. 17, 2009.

Notice of Opposition-Exhibit D4-Changings in MCU-Software; cited in Opposition dated Sep. 17, 2009.

Notice of Opposition-Exhibit D5-Service Manual BT VR; cited in Opposition dated Sep. 17, 2009.

Exhibit D12-Service Message; Attached to Letter from Albihns-Zacco dated Oct. 5, 2010.

Exhibit D13a-Engineering Change Note; Attached to Letter from Albihns-Zacco dated Oct. 5, 2010.

Observations in Response to the Notice of Opposition; Mar. 18, 2010.

Communication of Notice of Opposition from Epo; Oct. 22,2009.

(56) References Cited

OTHER PUBLICATIONS

Letter from Albihns-Zacco; May 10, 2010.
Summons to Attend Oral Proceedings; 5/12111.
Response to Summons and Written Observations; Aug. 8, 2011.
Letter from Albihns-Zacco; Sep. 1, 2011.
Iso/Fdis 3691.
Interlocutory Decision in Opposition from Epo; Feb. 7, 2012.
Leasing Agreement D1 f; attached to Letter from Albihns-Zacco dated Sep. 1, 2011.
Ross, Kenneth; Invitation to Pay Additional Fees including Communication Relating to the Results of the Partial International Research; May 11, 2012; International Application no. PCT/US2012/024838.
Serodio, Renato; International Search Report and Written Opinion; Application No. PCT/US2012/024838; Jul. 31, 2012; European Patent Office; Munich, Germany.

* cited by examiner

MATERIALS HANDLING VEHICLE ESTIMATING A SPEED OF A MOVABLE ASSEMBLY FROM A LIFT MOTOR SPEED

CROSS REFERENCE TO RELATED APPLICATIONS

This application is a division of U.S. patent application Ser. No. 13/371,789, filed Feb. 13, 2012 and entitled "MATERIALS HANDLING VEHICLE ESTIMATING A SPEED OF A MOVABLE ASSEMBLY FROM A LIFT MOTOR SPEED," the entire disclosure of which is hereby incorporated by reference herein. This application and U.S. patent application Ser. No. 13/371,789 claim the benefit of U.S. Provisional Patent Application Ser. Nos. 61/443,302, filed Feb. 16, 2011, entitled "MATERIALS HANDLING VEHICLE ESTIMATING A SPEED OF A MOVABLE ASSEMBLY FROM A LIFT MOTOR SPEED" and U.S. Provisional Patent Application Ser. No. 61/560,480, filed Nov. 16, 2011, entitled "MATERIALS HANDLING VEHICLE ESTIMATING A SPEED OF A MOVABLE ASSEMBLY FROM A LIFT MOTOR SPEED" which are both hereby incorporated by reference herein in their entireties.

BACKGROUND OF THE INVENTION

U.S. Pat. No. 7,344,000 B2 discloses a materials handling vehicle comprising a base, such as a power unit, and a carriage assembly, such as a platform assembly, wherein the carriage assembly is movable relative to the base. The vehicle further comprises a cylinder coupled to the base to effect movement of the carriage assembly relative to the base and a hydraulic system to supply a pressurized fluid to the cylinder. The hydraulic system includes an electronically controlled valve coupled to the cylinder. The vehicle further comprises control structure to control the operation of the valve such that the valve is closed in the event of an unintended descent of the carriage assembly in excess of a commanded speed.

SUMMARY OF THE INVENTION

In accordance with a first aspect of the present invention, a materials handling vehicle is provided comprising: a support structure including a fixed member; a movable assembly coupled to the support structure; a hydraulic system; and a control system. The support structure further comprises lift apparatus to effect movement of the movable assembly relative to the support structure fixed member. The lift apparatus includes at least one ram/cylinder assembly. The hydraulic system includes a motor, a pump coupled to the motor to supply a pressurized fluid to the at least one ram/cylinder assembly, and at least one electronically controlled valve associated with the at least one ram/cylinder assembly. The control structure may estimate a speed of the movable assembly from a speed of the motor and control the operation of the at least one valve using the estimated movable assembly speed.

The control structure is capable of energizing the at least one valve so as to open the at least one valve to permit the movable assembly to be lowered in a controlled manner to a desired position relative to the support structure fixed member.

The control structure may de-energize the at least one valve in response to an operator-generated command to cease further descent of the movable assembly relative to the support structure fixed member.

The at least one valve may function as a check valve when de-energized so as to block pressurized fluid from flowing out of the at least one ram/cylinder assembly, and allowing pressurized fluid to flow into the at least one ram/cylinder assembly during a movable assembly lift operation.

The at least one valve may comprise a solenoid-operated, normally closed, proportional valve.

The at least one valve may be positioned in a base of the at least one ram/cylinder assembly.

The support structure may further comprise a power unit and the support structure fixed member may comprise a first mast weldment fixedly coupled to the power unit. The lift apparatus may comprise: a second mast weldment movable relative to the first mast weldment and a third mast weldment movable relative to the first and second mast weldments. The at least one ram/cylinder assembly may comprise: at least one first ram/cylinder assembly coupled between the first and second mast weldments for effecting movement of the second and third mast weldments relative to the first mast weldment and a second ram/cylinder assembly coupled between the third mast weldment and the movable assembly so as to effect movement of the movable assembly relative to the third mast weldment. The at least one electronically controlled valve may comprise: at least one first solenoid-operated, normally closed, proportional valve associated with the at least one first ram/cylinder assembly, and a second solenoid-operated, normally closed, proportional valve associated with the second ram/cylinder assembly.

The control structure may comprise: encoder apparatus associated with the movable assembly for generating encoder pulses as the movable assembly moves relative to the first mast weldment, and a controller coupled to the encoder apparatus and the first and second valves for receiving the encoder pulses generated by the encoder apparatus and determining a determined movable assembly speed based on the encoder pulses.

The control structure may control the operation of the at least one first valve and the second valve by comparing the determined movable assembly speed with at least one of a first threshold speed based on the first estimated movable assembly speed and a fixed, second threshold speed.

The controller may function to de-energize the first and second valves causing them to move from their powered open state to their closed state in the event the movable assembly moves downwardly at the determined movable assembly speed in excess of one of the first and second threshold speeds.

The controller may slowly close the first and second valves in the event the movable assembly moves downwardly at a speed in excess of the first or the second threshold speed.

The controller may cause the first and second valves to move from their powered open position to their closed position over a time period of from about 0.3 second to about 1.0 second.

The control structure may estimate the movable assembly speed from the motor speed by: converting motor speed into a pump fluid flow rate, converting the pump fluid flow rate into a ram speed and converting the ram speed into the estimated movable assembly speed.

The control structure may use an estimated movable assembly speed and a determined movable assembly speed to generate an updated pump volumetric efficiency and use the updated pump volumetric efficiency when calculating a subsequent estimated movable assembly speed.

The control structure may be configured to measure an electric current flow into or out of the hydraulic system motor and to reduce an operating speed of the hydraulic system motor if the electric current flow into or out of the hydraulic system motor is greater than or equal to a predetermined threshold value.

The control structure may be configured to monitor a pressure of the pressurized fluid and to implement a response routine comprising controlling the at least one valve to control lowering of the support structure if the monitored pressure falls below a threshold pressure.

The threshold pressure may be dependent upon at least one of a maximum lift height of the movable assembly and a weight of a load supported by the support structure.

In accordance with a second aspect of the present invention, a materials handling vehicle is provided comprising: a fixed mast weldment; at least one movable mast weldment coupled to the fixed mast weldment; a fork carriage apparatus movably coupled to the at least one movable mast weldment; at least one first ram/cylinder assembly coupled to the fixed mast weldment and the at least one movable mast weldment to effect movement of the at least one movable mast weldment relative to the fixed mast weldment; a second ram/cylinder assembly coupled to the fork carriage apparatus and the at least one movable mast weldment to effect movement of the fork carriage apparatus relative to the at least one movable mast weldment; a hydraulic system; and a control structure. The hydraulic system may include a motor, a pump coupled to the motor to supply a pressurized fluid to the first and second ram/cylinder assemblies, and at least one first electronically controlled valve and a second electronically controlled valve associated with the at least one first ram/cylinder assembly and the second ram/cylinder assembly. The control structure may estimate a speed of the fork carriage assembly relative to the fixed mast weldment from a speed of the motor and control the operation of the first and second valves using the estimated fork carriage assembly speed.

The control structure may control the operation of the valves by comparing a determined fork carriage apparatus speed and a threshold speed based on the estimated fork carriage apparatus speed.

In accordance with a third aspect of the present invention, a materials handling vehicle is provided comprising: a support structure including a fixed member; a movable assembly coupled to the support structure; a hydraulic system and a control structure. The support structure may further comprise lift apparatus to effect movement of the movable assembly relative to the support structure fixed member. The lift apparatus may include at least one ram/cylinder assembly. The hydraulic system may include a motor, a pump coupled to the motor to supply a pressurized fluid to the at least one ram/cylinder assembly, and an electronically controlled valve associated with the at least one ram/cylinder assembly. The control structure may estimate a speed of the movable assembly from a speed of the motor and calculate an updated pump volumetric efficiency using the estimated movable assembly speed and a determined movable assembly speed.

The control structure may determine the updated volumetric efficiency using the following equation:

$$\text{updated volumetric efficiency}=(\text{determined movable assembly speed}*\text{current volumetric efficiency})/\text{estimated movable assembly speed}.$$

The current volumetric efficiency may be derived based on one or more of a speed of the materials handling vehicle, a direction of rotation of the pump, and a pressure, a temperature, and/or a viscosity of the pressurized fluid.

The fixed member may comprise a fixed mast weldment coupled to a power unit.

The lift apparatus may further comprise at least one movable mast weldment and the movable assembly may comprise a fork carriage assembly which moves relative to the support structure fixed member.

In accordance with a fourth aspect of the present invention, a materials handling vehicle is provided comprising: a support structure including a fixed member; a movable assembly coupled to the support structure; a hydraulic system and a control structure. The support structure may further comprise lift apparatus to effect movement of the movable assembly relative to the support structure fixed member. The lift apparatus may include at least one ram/cylinder assembly. The hydraulic system may include a motor and a pump coupled to the motor to supply a pressurized fluid to the at least one ram/cylinder assembly. The control structure may measure an electric current flow into or out of the hydraulic system motor and reduce an operating speed of the hydraulic system motor if the electric current flow into or out of the hydraulic system motor is greater than or equal to a predetermined threshold value.

In accordance with a fifth aspect of the present invention, a materials handling vehicle is provided comprising: a support structure including a fixed member; a movable assembly coupled to the support structure; and a control structure. The support structure further comprises lift apparatus to effect movement of the movable assembly relative to the support structure fixed member. The lift apparatus includes hydraulic structure comprising at least one ram/cylinder assembly, at least one hydraulic fluid line in communication with the at least one ram/cylinder assembly, and a hydraulic system that supplies a pressurized fluid to the at least one ram/cylinder assembly via the at least one hydraulic fluid line. The control structure monitors a pressure of hydraulic fluid within the hydraulic structure and implements a response routine if the monitored pressure of the hydraulic fluid within the hydraulic structure falls below a threshold pressure.

The threshold pressure may be dependent upon at least one of a maximum lift height the movable assembly and a weight of a load supported by the support structure.

The threshold pressure may be calculated by the following equation:

$$T_P(\text{psi})=[A(\text{psi/pound})*\text{Load(pounds)}]/100(\text{unitless})+[(\text{Height(inches)}*100(\text{unitless})]/B(\text{inches/psi})$$

wherein $T_P$ is the threshold pressure, A is a constant, Load is the weight of a load supported on the support structure, 100 is a unitless scaling factor, Height is the maximum lift height of the movable assembly, 100 is a unitless scaling factor, and B is a constant.

The control structure may only implement the response routine if the support structure is determined to be lowering at a speed equal to or above a predetermined speed.

The response routine may comprise the controller controlling operation of at least one valve to control lowering of the support structure.

DETAILED DESCRIPTION OF THE INVENTION

Figure 1:
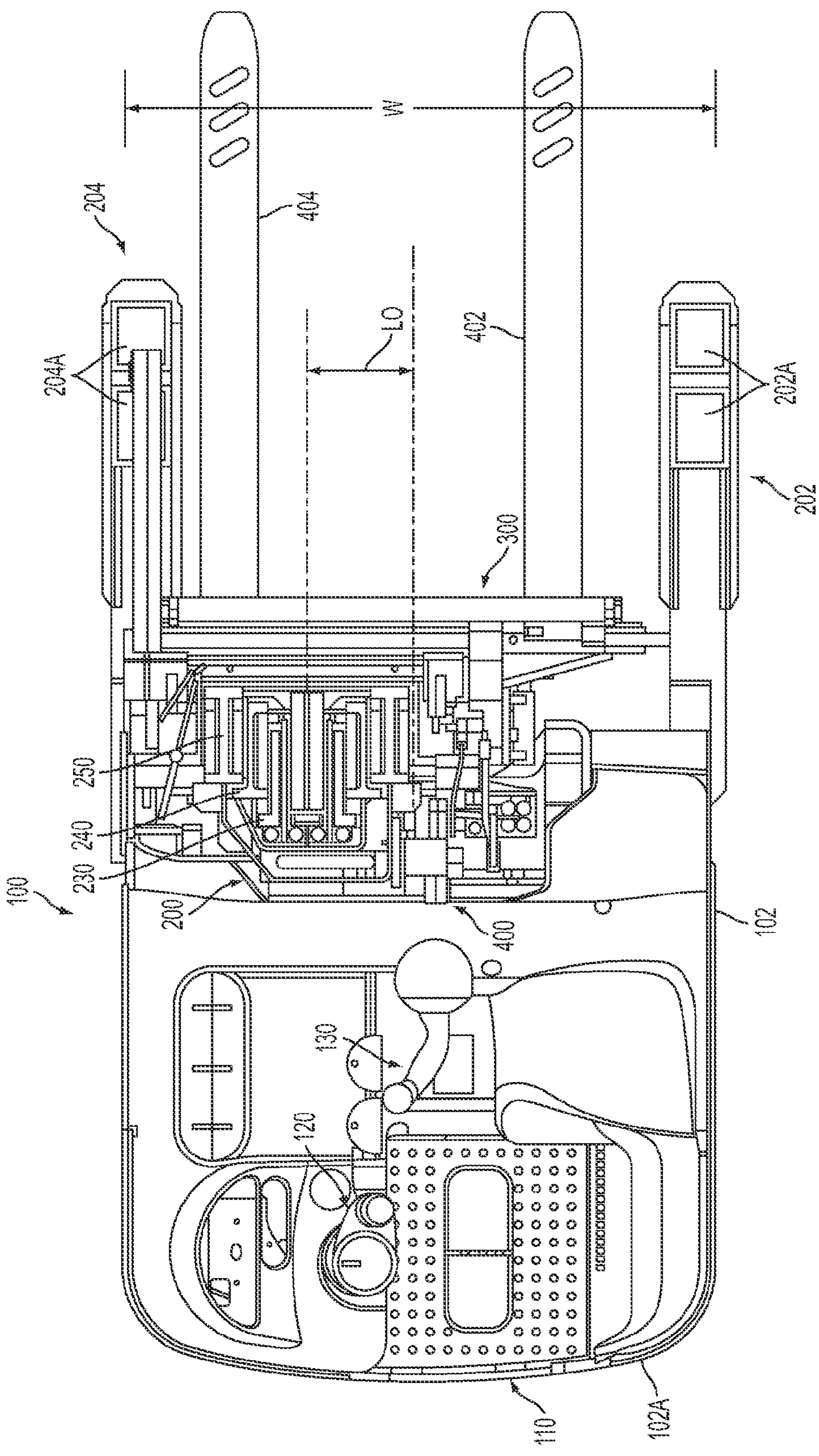
FIG. 1 is a top view of a materials handling vehicle in which a monomast constructed in accordance with the present invention is incorporated.
Figure 3:
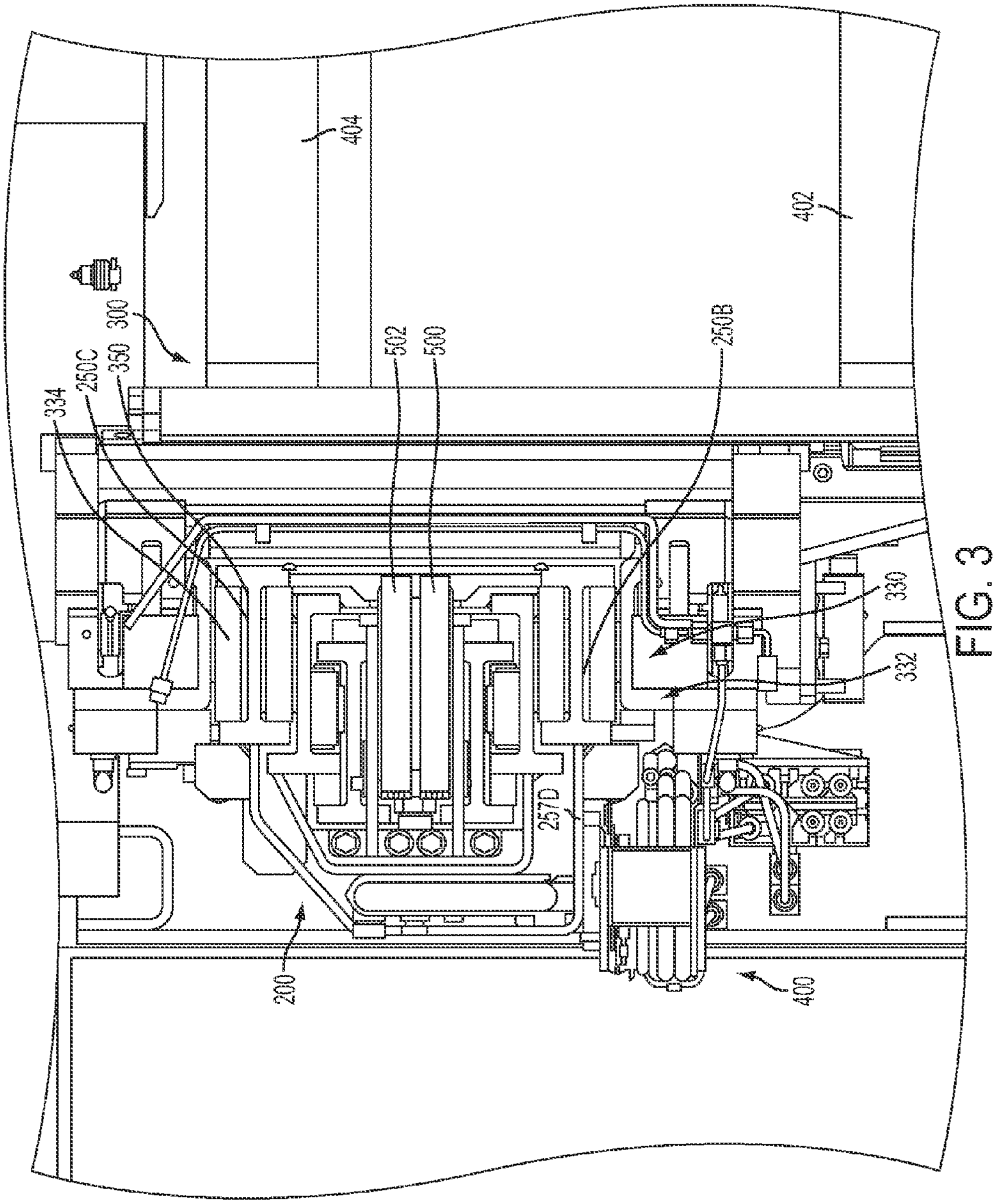
FIG. 3 is an enlarged top view of the monomast illustrated in FIG. 1.

FIG. 1 illustrates a top view of a materials handling vehicle 100 comprising a rider reach truck 100. A monomast 200, a mast weldment lift structure 220, a fork carriage apparatus 300 and a fork carriage apparatus lift structure 400, constructed in accordance with a first embodiment of the present invention, are incorporated into the rider reach truck 100, see also FIGS. 3 and 9.

Figure 2:
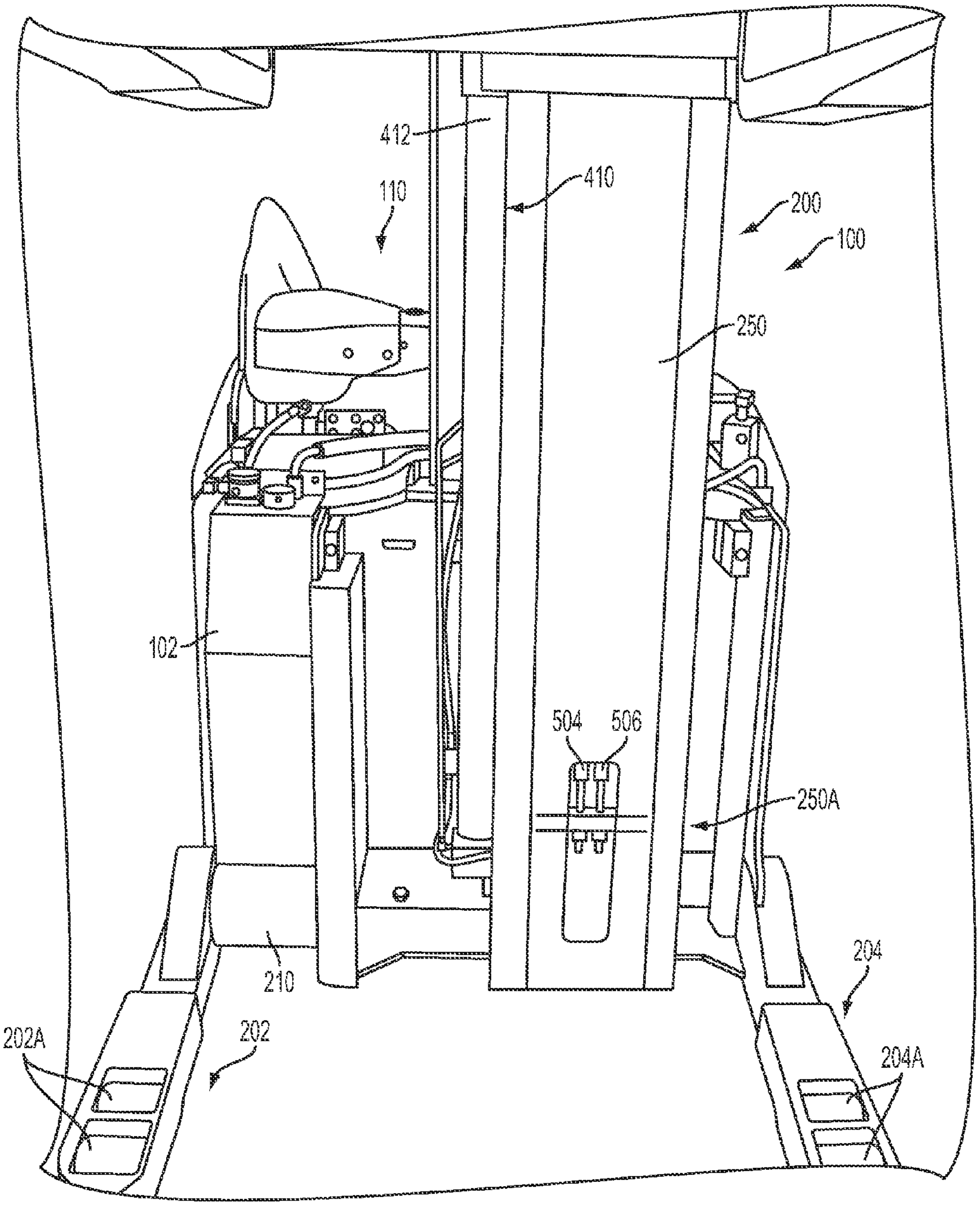
FIG. 2 is a front view of the vehicle illustrated in FIG. 1 with a fork carriage apparatus elevated.

The truck 100 further includes a vehicle power unit 102, see FIGS. 1 and 2. The power unit 102 houses a battery (not shown) for supplying power to a traction motor coupled to a steerable wheel (not shown) mounted near a first corner at the rear 102A of the power unit 102. Mounted to a second corner at the rear 102A of the power unit 102 is a caster wheel (not shown). A pair of outriggers 202 and 204 are mounted to a monomast frame 210, see FIG. 2. The outriggers 202 and 204 are provided with supports wheels 202A and 204A. The battery also supplies power to a lift motor 301, which drives a hydraulic lift pump 302, see FIG. 9. As will be discussed in further detail below, the lift pump 302 supplies pressurized hydraulic fluid to the fork carriage apparatus lift structure 400 and the mast weldment lift structure 220. While not illustrated, a further motor and pump may be provided to supply pressurized hydraulic fluid to accessory mechanisms, such as a side-shift mechanism, a tilt mechanism and/or a reach mechanism.

The vehicle power unit 102 includes an operator's compartment 110. An operator standing in the compartment 110 may control the direction of travel of the truck 100 via a tiller 120. The operator may also control the travel speed of the truck 100, and height, extension, tilt and side shift of first and second forks 402 and 404 via a multifunction controller 130, see FIG. 1. The first and second forks 402 and 404 form part of the fork carriage apparatus 300.

The monomast 200 may be constructed as set out in U.S. Patent Application Publication No. 2010/0065377 A1, entitled "Monomast for a Materials Handling Vehicle," filed on Sep. 10, 2009, the entire disclosure of which is incorporated herein by reference. Briefly, the monomast 200 comprises a fixed first stage mast weldment 230 (also referred to herein as a fixed member), a second stage mast weldment 240 positioned to telescope over the first stage weldment 230 and a third stage mast weldment 250 positioned to telescope over the first and second stage weldments 230 and 240, see FIGS. 1 and 3-5. The mast weldment lift structure 220 effects lifting movement of the second and third stage weldments 240 and 250 relative to the fixed first stage weldment 230, see FIG. 9.

Support structure is defined herein as comprising the power unit 102, the fixed first mast weldment 230 and lift apparatus. Lift apparatus is defined herein as comprising the second and third mast weldments 240 and 250, the mast weldment lift structure 220 and the fork carriage apparatus lift structure 400.

Figure 4:
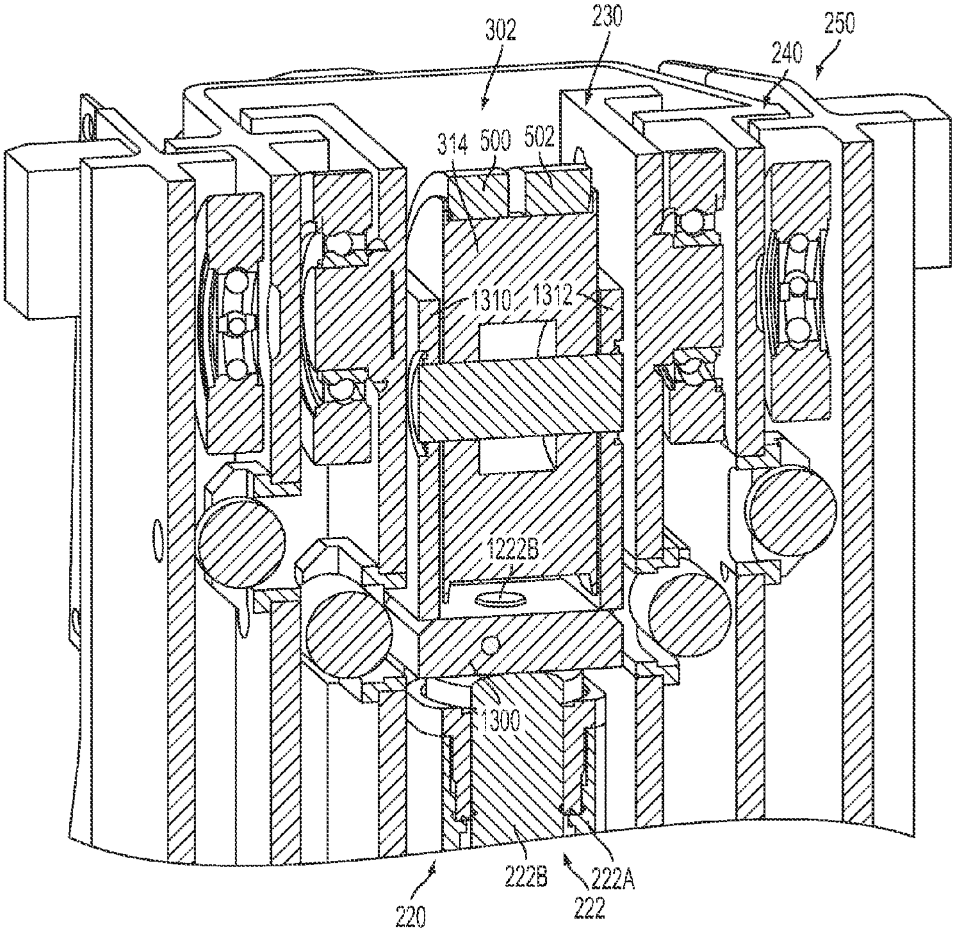
FIG. 4 is a side view, partially in cross section, of an upper portion of the monomast.
Figure 5:
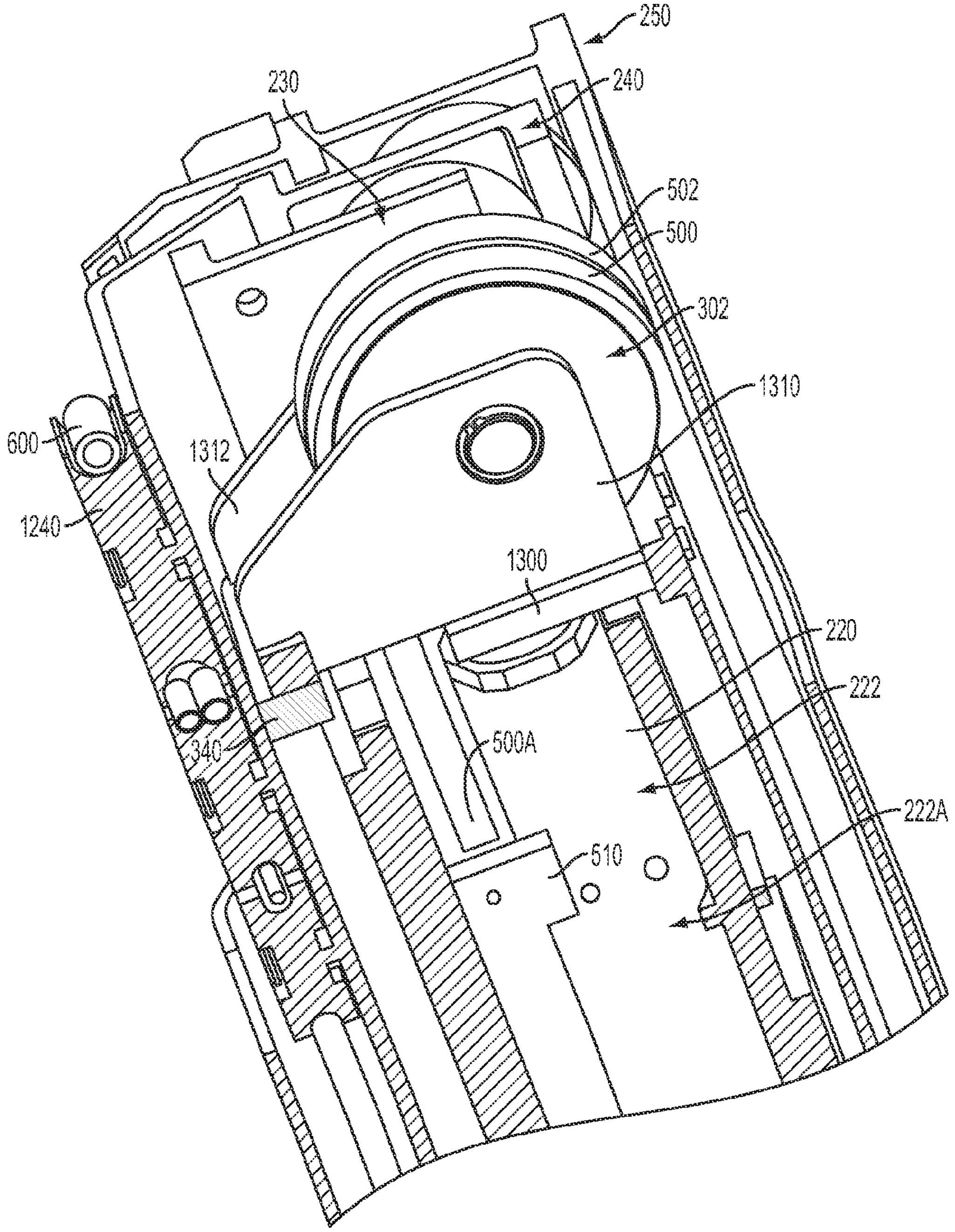
FIG. 5 is a perspective side view, partially in cross section, of the monomast upper portion.
Figure 6:
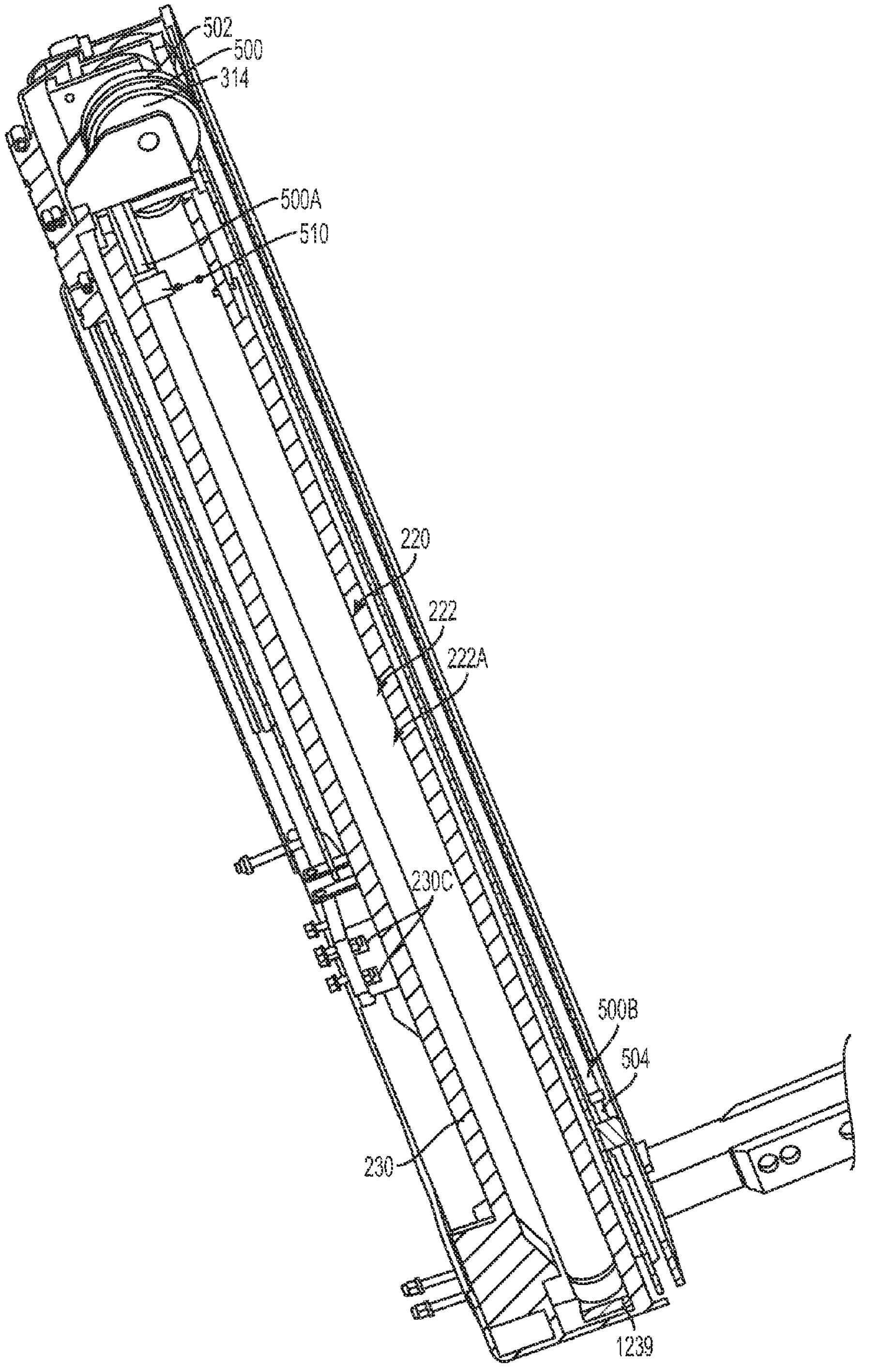
FIG. 6 is a side view, partially in cross section, of the monomast.

The mast weldment lift structure 220 comprises a hydraulic ram/cylinder assembly 222 comprising a cylinder 222A and a ram 222B, see FIGS. 4-6. The cylinder 222A is fixedly coupled to a base 1239 forming part of the first stage weldment 230, see FIG. 6. Hence, the cylinder 222A does not move vertically relative to the vehicle power unit 102.

An engagement plate 1300 of a pulley assembly 302 is coupled to an end portion 1222B of the ram 222B, see FIG. 4. The pulley assembly 302 further comprises first and second vertical plates 1310 and 1312, which are fixed to the engagement plate 1300 by welds. A pulley or roller 314 is received between and rotatably coupled to the first and second vertical plates 1310 and 1312. The pulley assembly 302 is fixedly coupled to the second stage weldment 240 by coupling structure (not shown). First and second chains 500 and 502 are coupled at first ends (only the first end 500A of the first chain 500 is clearly illustrated in FIG. 6) to chain anchors (not shown) which, in turn, are bolted to a bracket 510 fixedly welded to the cylinder 222A of the hydraulic ram/cylinder assembly 222, see FIG. 6. Opposing second ends of the first and second chains 500 and 502 (only the second end 500B of the first chain 500 is clearly illustrated in FIG. 6) are coupled to a lower section of the third stage weldment 250 via coupling anchors 504 and 506, see FIGS. 2 and 6. The first and second chains 500 and 502 extend over the pulley or roller 314 of the pulley assembly 302, see FIG. 4. When the ram 222B is extended, it causes the pulley assembly 302 to move vertically upward such that the pulley 314 pushes upwardly against the first and second chains 500 and 502. As the pulley 314 applies upward forces on the chains 500 and 502, the second stage weldment 240 moves vertically relative to the first stage weldment 230 and the third stage weldment 250 moves vertically relative to the first and second stage weldments 230 and 240. For every one unit of vertical movement of the second stage weldment 240 relative to the first stage weldment 230, the third stage weldment 250 moves vertically two units relative to the first stage weldment 230.

Figure 7:
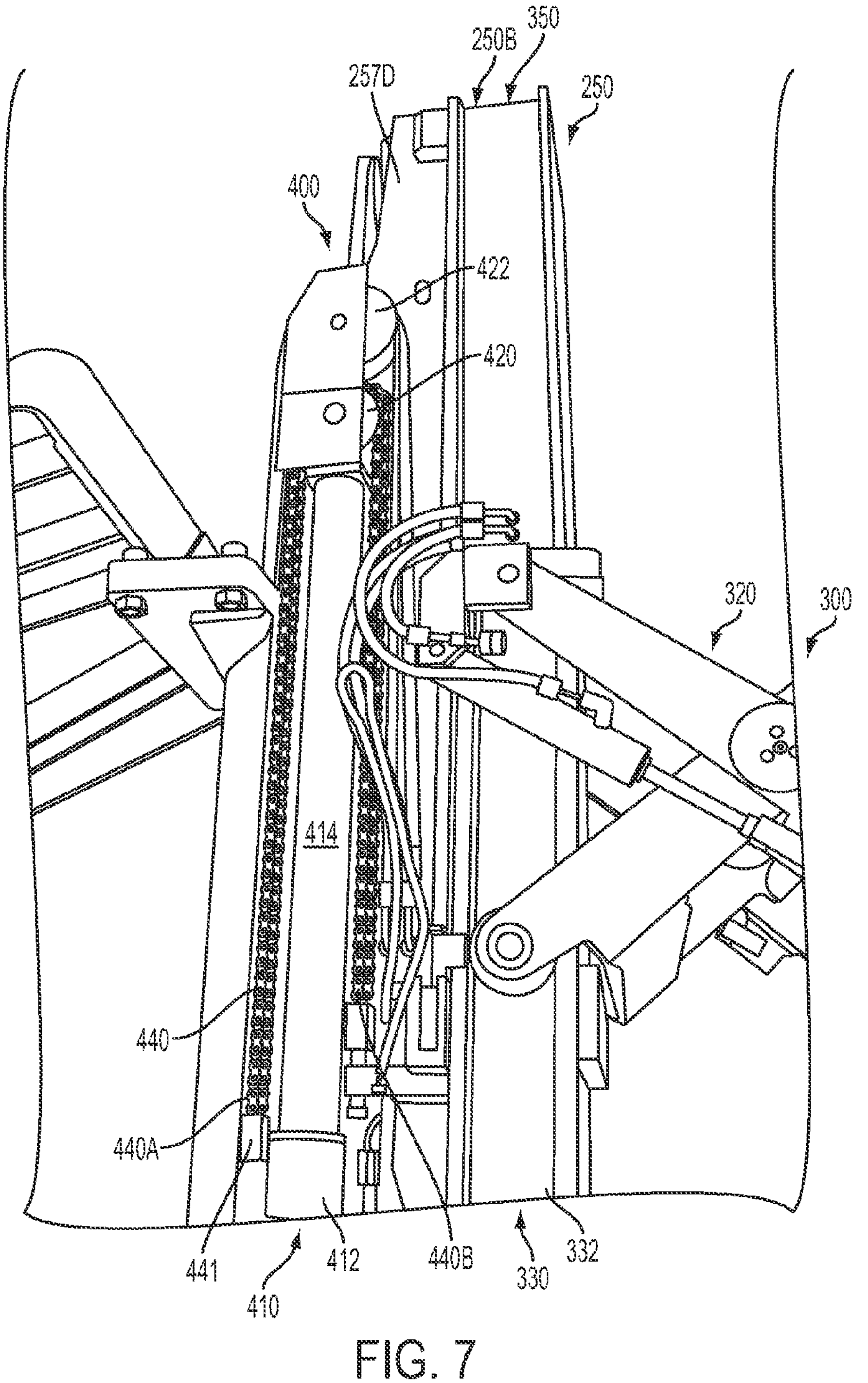
FIG. 7 is a perspective side view illustrating the monomast and a portion of the fork carriage apparatus.
Figure 8:
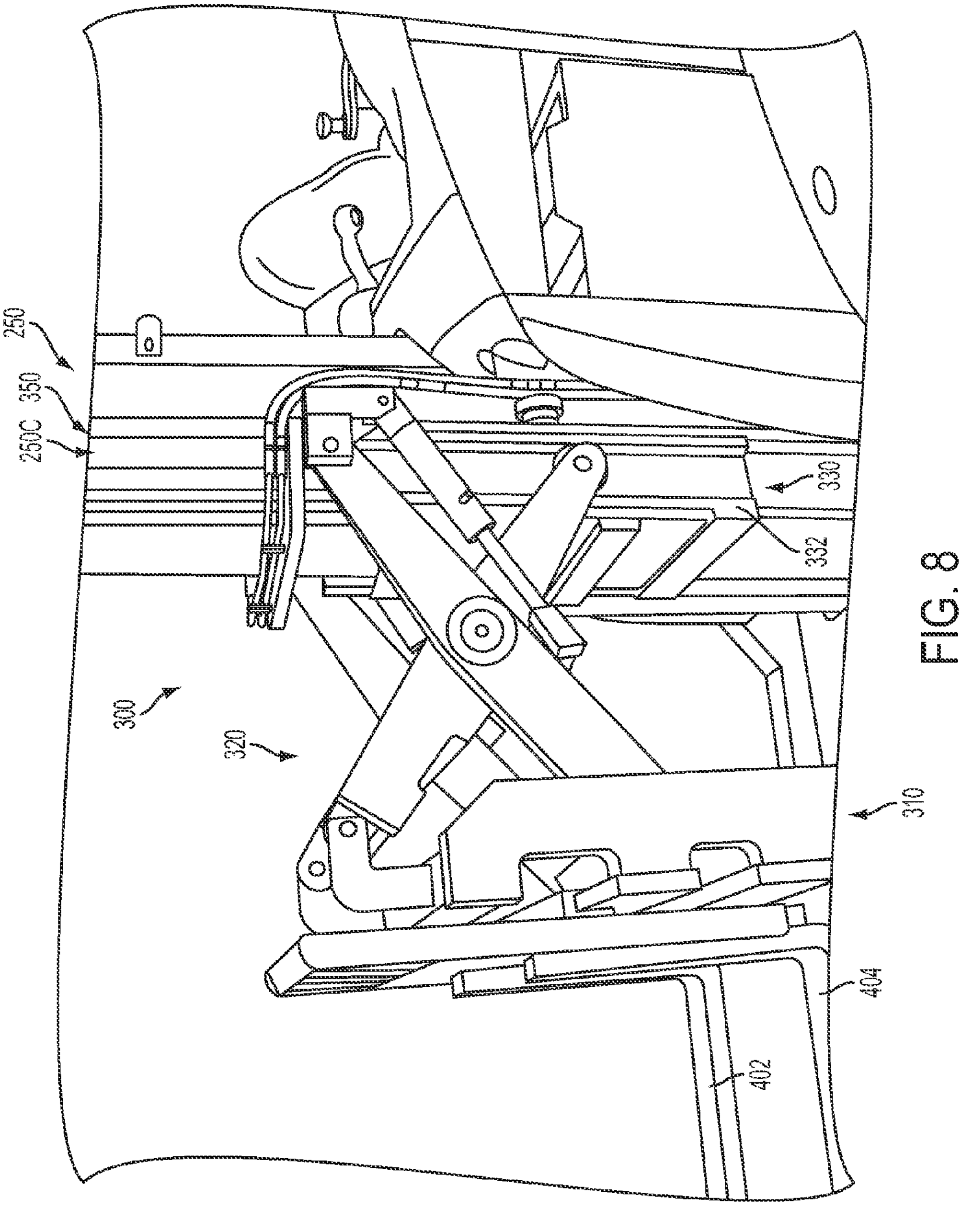
FIG. 8 is a perspective side view illustrating the fork carriage apparatus coupled to the monomast illustrated in FIG. 1.

The fork carriage apparatus 300, also referred to herein as a movable assembly, is coupled to the third stage weldment 250 so as to move vertically relative to the third stage weldment 250, see FIG. 7. The fork carriage apparatus 300 also moves vertically with the third stage weldment 250 relative to the first and second stage weldments 230 and 240. The fork carriage apparatus 300 comprises a fork carriage mechanism 310 to which the first and second forks 402 and 404 are mounted, see FIG. 8. The fork carriage mechanism 310 is mounted to a reach mechanism 320 which, in turn, is mounted to a mast carriage assembly 330, see FIGS. 7 and 8. The mast carriage assembly 330 comprises a main unit 332 having a plurality of rollers 334 which are received in tracks 350 formed in opposing outer sides surfaces 250B and 250C of the third stage weldment 250, see FIGS. 3 and 7. As noted above, accessory mechanisms, such as a side-shift mechanism, a tilt mechanism and/or a reach mechanism may be provided to laterally move, tilt and/or extend the forks 402 and 404.

The fork carriage apparatus lift structure 400 comprises a hydraulic ram/cylinder assembly 410 including a cylinder 412 and a ram 414, see FIG. 7. The cylinder 412 is fixedly coupled to a side section 257D of the third stage weldment 250. First and second pulleys 420 and 422 are coupled to an upper end of the ram 414, see FIG. 7. A lift chain 440 extends over the first pulley 420 and is coupled at a first end 440A to the cylinder 412 via chain anchors and a bracket 441 welded to the cylinder 412 and at its second end 440B to the mast carriage assembly 330, see FIG. 7. Vertical movement of the ram 414 effects vertical movement of the entire fork carriage apparatus 300 relative to the third stage weldment 250. For every one unit of vertical movement of the ram 414 and the first pulley 420 relative to the third stage weldment 250, the fork carriage apparatus 300 moves vertically two units relative to the third stage weldment 250.

The materials handling vehicle 100 comprises a hydraulic system 401 comprising the lift motor 301, which drives the hydraulic lift pump 302, as noted above. The lift motor 301 comprises a velocity (RPM) sensor. The pump 302 supplies pressurized hydraulic fluid to the hydraulic ram/cylinder assembly 222 of the mast weldment lift structure 220 and the hydraulic ram/cylinder assembly 410 of the fork carriage apparatus lift structure 400.

Figure 9:
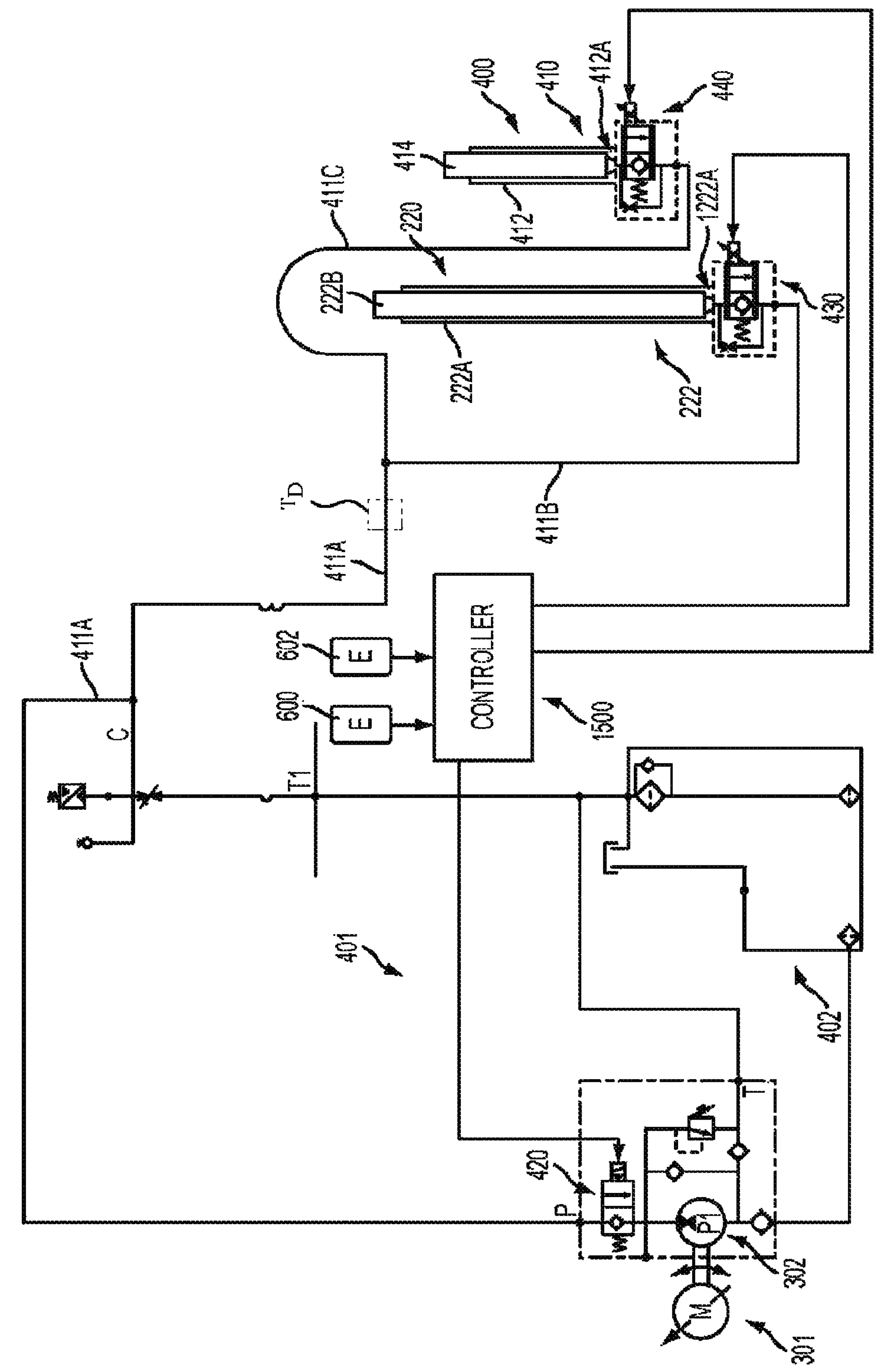
FIG. 9 is a schematic diagram illustrating the motor, pump, controller, electronic normally closed ON/OFF solenoid-operated valve, first and second electronic normally closed proportional solenoid-operated valves, mast weldment lift structure and fork carriage apparatus lift structure.

The hydraulic system 401 further comprises a hydraulic fluid reservoir 402, see FIG. 9, which is housed in the power unit 102, and fluid hoses/lines 411A-411C coupled between the pump 302 and the mast weldment lift structure hydraulic ram/cylinder assembly 222 and the fork carriage apparatus lift structure hydraulic ram/cylinder assembly 410. The fluid hoses/lines 411A and 411B are coupled in series and function as supply/return lines between the pump 302 and the mast weldment structure hydraulic ram/cylinder assembly 222. The fluid hoses/lines 411A and 411C are coupled in series and function as supply/return lines between the pump 302 and the fork carriage apparatus lift structure hydraulic ram/cylinder assembly 410. Because the fluid hose/line 411A is directly coupled to both fluid hoses/lines 411B and 411C, all three lines 411A-411C are always at the substantially the same fluid pressure.

The hydraulic system 401 also comprises an electronic normally closed ON/OFF solenoid-operated valve 420 and first and second electronic normally closed proportional solenoid-operated valves 430 and 440. The valves 420, 430 and 440 are coupled to an electronic controller 1500 for controlling their operation, see FIG. 9. The electronic controller 1500 forms part of a "control structure." The normally closed ON/OFF solenoid valve 420 is energized by the controller 1500 only when one or both of the rams 222B and 414 are to be lowered. When de-energized, the solenoid valve 420 functions as a check valve so as to block pressurized fluid from flowing from line 411A, through the pump 302 and back into the reservoir 402, i.e., functions to prevent downward drift of the fork carriage apparatus 300, yet allows pressurized fluid to flow to the cylinders 222A and 412 via the lines 411A-411C during a lift operation.

The first electronic normally closed proportional solenoid-operated valve 430 is located within and directly coupled to a base 1222A of the cylinder 222A of the mast weldment lift structure hydraulic ram/cylinder assembly 222, see FIG. 9. The second electronic normally closed proportional solenoid-operated valve 440 is located within and directly coupled to a base 412A of the cylinder 412 of the fork carriage apparatus lift structure hydraulic ram/cylinder assembly 410. The first normally closed proportional solenoid-operated valve 430 is energized, i.e., opened, by the controller 1500 when the ram 222B is to be lowered. The second normally closed proportional solenoid-operated valve 440 is energized, i.e., opened, by the controller 1500 when the ram 414 is to be lowered. When de-energized, the first and second normally closed proportional solenoid-operated valves 430 and 440 function as a check valves so as to block pressurized fluid from flowing out of the cylinders 222A and 412. The valves 430 and 440, when functioning as check valves, also permit pressurized hydraulic fluid to flow into the cylinders 222A and 412 during a lift operation.

When a lift command is generated by an operator via the multifunction controller 130, both the cylinder 412 of the fork carriage apparatus lift structure 400 and the cylinder 222A of the mast weldment lift structure 220 are exposed to hydraulic fluid at the same pressure via the lines 411A-411C. Because the ram 414 of the fork carriage apparatus lift structure 400 and the ram 222B of the mast weldment lift structure 220 include base ends having substantially the same cross sectional areas and for all load conditions, the fork carriage apparatus lift structure 400 requires less pressure to actuate than the mast weldment lift structure 220, the ram 414 of the fork carriage apparatus lift structure 400 will move first until the fork carriage apparatus 300 has reached its maximum height relative to the third stage weldment 250. Thereafter, the second and third stage weldments 240 and 250 will begin to move vertically relative to the first stage weldment 230.

When a lowering command is generated by an operator via the multifunction controller 130, the electronic controller 1500 causes the electronic normally closed ON/OFF solenoid-operated valve 420 to open. Presuming the rams 222B and 414 are fully extended when a lowering command is generated, the first proportional valve 430 is energized by the controller 1500, causing it to fully open in the illustrated embodiment to allow fluid to exit the cylinder 222A of the mast weldment lift structure 220, thereby allowing the second and third stage weldments 240 and 250 to lower. Once the second and third stage weldments 240 and 250 near their lowermost positions, the controller 1500 causes the second proportional valve 440 to substantially fully open and the first proportional valve 430 to partially close. Partially closing the first valve 430 causes the fluid pressure in the lines 411A-411C to lower. By opening the second valve 440 and partially closing the first valve 430, the ram 414 begins to lower, while the ram 222B continues to lower. After the ram 222B reaches its lowermost position, the ram 414 continues to lower until the fork carriage apparatus 300 reaches its lowermost position. Except for the partial closure of the first proportional valve 430 when the second and third stage weldments 240 and 250 near their lowermost positions, the speed at which fluid is metered from the cylinder 222A of the mast weldment lift structure 220 and the cylinder 412 of the fork carriage apparatus lift structure 400 is generally controlled by the pump 302.

First and second encoder units 600 and 602, respectfully, also forming part of the "control structure," are provided and may comprise conventional friction wheel encoder assemblies or conventional wire/cable encoder assemblies, see FIG. 9. In the illustrated embodiment, the first encoder unit 600 comprises a first friction wheel encoder assembly mounted to the third stage weldment 250 such that a first friction wheel engages and moves along the second stage weldment 240.

Hence, as the third stage weldment 250 moves relative to the second stage weldment 240, the first friction wheel encoder generates pulses to the controller 1500 indicative of the third stage weldment movement relative to the second stage weldment 240.

Also in the illustrated embodiment, the second encoder unit 602 comprises a second friction wheel assembly mounted to the fork carriage apparatus 300 such that a second friction wheel engages and moves along the third mast stage weldment 250. Hence, as the fork carriage apparatus 300 moves relative to the third stage weldment 250, the second friction wheel encoder generates pulses to the controller 1500 indicative of the fork carriage apparatus 300 movement relative to the third stage weldment 250.

As noted above, the first and second encoder units 600 and 602 generate corresponding pulses to the controller 1500. The pulses generated by the first encoder unit 600 are used by the controller 1500 to determine the position of the third stage weldment 250 relative to the second stage weldment 240 as well as the speed of movement of the third stage weldment 250 relative to the second stage weldment 240. The controller 1500 also determines the speed and position of the third stage weldment 250 relative to the fixed first stage weldment 230, wherein the speed of the third stage weldment 250 relative to the first stage weldment 230 is equal to twice the speed of the third stage weldment 250 relative to the second stage weldment 240. Further, the distance from a reference point on the third stage weldment 250 to a reference point on the first stage weldment 230 is twice the distance from the reference point on the third stage weldment 240 to a reference point on the second stage weldment 230, wherein the reference point on the second stage weldment 240 is at a location corresponding to the reference point location on the first stage weldment 230. The pulses generated by the second encoder unit 602 are used by the controller 1500 to determine the position of the fork carriage apparatus 300 relative to the third mast stage weldment 250 as well as the speed of movement of the fork carriage apparatus 300 relative to the third mast stage weldment 250. By knowing the speed and position of the third stage weldment 250 relative to the first stage weldment 230 and the speed and position of the fork carriage apparatus 300 relative to the third stage weldment 250, the controller 1500 can easily determine the speed and position of the fork carriage apparatus 300 relative to the first stage weldment 230.

In accordance with the present invention, during a lowering command, the controller 1500 compares a determined or sensed speed of the fork carriage apparatus 300 relative to the first stage weldment 230 to first and second threshold speeds. This involves the controller 1500 determining a first speed comprising a determined or sensed speed of the third stage weldment 250 relative to the first stage weldment 230, determining a second speed comprising a determined or sensed speed of the fork carriage apparatus 300 relative to the third stage weldment 250 and adding the first and second determined speeds together to calculate a third determined speed. The third determined speed is equal to the determined or sensed speed of the fork carriage apparatus 300 relative to the first stage weldment 230.

As noted above, for every one unit of vertical movement of the second stage weldment 240 relative to the first stage weldment 230, the third stage weldment 250 moves vertically two units relative to the first stage weldment 230. In order to determine the first speed, the controller 1500 determines the speed of third stage weldment 250 relative to the second stage weldment 240 using the pulses from the first encoder unit 600, as noted above, and multiplies the determined speed of movement of the third stage weldment 250 relative to the second stage weldment 240 by "2". Hence, this provides the first speed, i.e., the determined speed of the third stage weldment 250 relative to the first stage weldment 230.

The second speed is equal to the determined speed of movement of the fork carriage apparatus 300 relative to the third mast stage weldment and is found using the pulses generated by the second encoder unit 602 as noted above.

During a lowering command, the controller 1500 may compare the third determined speed, i.e., the determined speed of the fork carriage apparatus 300 relative to the first stage weldment 230, to the first and second threshold speeds. In the illustrated embodiment, the comparison of the third determined speed to the first and second threshold speeds may be made by the controller 1500 once every predefined time period, e.g., every 5 milliseconds. The comparison of the third determined speed to the first and second threshold speeds is referred to herein as a "comparison event." If the third determined speed is greater than the first threshold speed during a predefined number of sequential comparison events, e.g., between 1-50 comparison events, or greater than the second threshold speed during a single comparison event, then the electronic controller 1500 implements a response routine, wherein the controller de-energizes the first and second electronic normally closed proportional solenoid-operated valves 430 and 440 so as to prevent further downward movement of the rams 222B and 414. The controller 1500 may cause the first and second valves 430 and 440 to move from their powered open positions to their closed positions immediately or over an extended time period, such as from about 0.3 second to about 1.0 second. By causing the first and second valves 430 and 440 to close over an extended time period, the magnitude of pressure spikes within the cylinders 222A and 412, which occur when the pistons 222B and 414 stop their downward movement within the cylinders 222A and 412, is reduced. Further, closing of the first and second valves 430 and 440 by the controller 1500 may comprise partially closing the first and second valves 430 and 440, i.e., not fully closing the first and second valves 430 and 440, so as to allow the fork carriage apparatus 300 and the second and third stage weldments 240, 250 to lower slowly to the ground. It is presumed that when the third determined speed is greater than one of the first and second threshold speeds, the fork carriage apparatus 300 is moving too quickly relative to the first stage weldment 230, i.e., at an unintended descent speed, which condition may occur when there is a loss of hydraulic pressure in the fluid being metered from one or both of the cylinders 222A and 412. Loss of hydraulic pressure may be caused by a breakage in one of the fluid lines 411A-411C.

In a further embodiment, the controller 1500 compares the third determined speed, i.e., the determined speed of the fork carriage apparatus 300 relative to the first stage weldment 230, to only the first threshold speed. The comparison of the third determined speed to the first threshold speed is made by the controller 1500 once every predefined time period, e.g., every 5 milliseconds. The comparison of the third determined speed to the first threshold speed is also referred to herein as a "comparison event." If the third determined speed is greater than the first threshold speed, during a predefined number of sequential comparison events, e.g., between 1-50 comparison events, then the electronic controller 1500 implements a response routine, wherein the controller 1500 de-energizes the first and second electronic normally closed proportional solenoid-operated valves 430 and 440 so as to prevent further downward movement of the rams 222B and 414.

The first threshold speed may be determined by the electronic controller 1500 as follows. First, the controller 1500 may estimate the magnitude of a combined lowering speed of the ram 222B of the mast weldment lift structure 220 and the ram 414 of the fork carriage apparatus lift structure 400 from a speed of the lift motor 301. As discussed above with respect to a lowering operation, with the fork carriage apparatus 300 and the second and third stage weldments 240 and 250 fully extended, the ram 222B begins to lower first, then the rams 222B and 414 lower simultaneously during a staging part of the lowering operation until the ram 222B reaches its lowermost position. Thereafter, the ram 414 continues its downward movement until it reaches its lowermost position.

First, the controller 1500 converts the lift motor speed into a lift pump fluid flow rate using the following equation:

pump fluid flow rate(gallons/minute)=[(lift motor speed(RPM))*(lift pump displacement(cc/revolution))*(lift motor volumetric efficiency)]/(3786 cc/gal)

The controller 1500 may then determine an estimated downward linear speed (magnitude) of the fork carriage apparatus 300 relative to the first stage weldment 230 using the following equation, which equation is believed to be applicable during all phases of a lowering operation, including staging when both the rams 222B and 414 are being lowered simultaneously:

estimated linear speed of the fork carriage apparatus 300 relative to the first weldment 230(inches/second)=[(pump fluid flow rate(gallons/minute))*(231 $in^3$/gallon)*(speed ratio)]/[(inside area of cylinder($in^2$))*(60 seconds/minute)]

wherein,

"inside area of cylinder"=cross sectional area of cylinder 222B, which equals the cross sectional area of cylinder 412 (only the cross sectional area of a single cylinder is used in the equation);

"speed ratio"=(the third weldment speed/first weldment speed)=(fork carriage apparatus speed/third weldment speed)=2/1 in the illustrated embodiment.

In the illustrated embodiment, the first threshold speed is equal to the estimated speed of the fork carriage apparatus 300 relative to the first weldment 230 times either a first tolerance factor, e.g., 1.6, or a second tolerance factor, e.g., 1.2. Once an operator gives a command via the multi-function controller 130 to lower the fork carriage apparatus 300, the controller 1500 executes a ramping function within its software so as to increase the magnitude of the downward lowering speed of the fork carriage apparatus 300 in a controlled manner at a predetermined rate, e.g., a speed change of from about 4 feet/minute to about 40 feet/minute every 16 milliseconds, based on the position of the multifunction controller 130, until the commanded downward speed is reached. The first tolerance factor is used when the fork carriage apparatus lowering speed is in the process of being ramped to the commanded speed, i.e., the controller 1500 is still executing the ramping function, and the second tolerance factor is used when the controller 1500 is no longer increasing the speed of the lift motor 301, i.e., the controller 1500 has completed the ramping function. The first tolerance factor is greater than the second tolerance factor to account for the physical lag time occurring between when an operator commands a speed change and the speed of the fork carriage apparatus actually occurs. It is also contemplated that in an alternative embodiment, the first threshold speed may equal the estimated speed of the fork carriage apparatus 300 relative to the first weldment 230.

The controller 1500 may use the determined downward speed of the fork carriage apparatus relative to the first stage weldment, the estimated fork carriage apparatus downward speed relative to the first weldment and the current pump volumetric efficiency to generate an updated pump volumetric efficiency, which updated pump volumetric efficiency may be used by the controller 1500 the next time it converts lift motor speed into a lift pump fluid flow rate. The controller 1500 may determine the updated pump volumetric efficiency using the following equation:

updated pump volumetric efficiency=(determined fork carriage apparatus speed*current volumetric efficiency)/(estimated fork carriage apparatus speed).

An initial pump volumetric efficiency, i.e., one used when the controller 1500 is first activated and one applied in the above equation as the "current volumetric efficiency" the first time an updated pump volumetric efficiency is calculated, e.g., the first time after a lowering operation is commenced, may equal 95% or any other appropriate value. The initial pump volumetric efficiency may be stored in memory associated with the controller 1500. In accordance with another aspect of the invention, rather than using a single initial pump volumetric efficiency, multiple volumetric efficiency points that correspond to, for example, the speed of the truck 100, although other vehicle conditions could be used, such as hydraulic fluid pressure, hydraulic fluid temperature, hydraulic fluid viscosity, direction of rotation of the hydraulic lift pump 302, etc., may be stored in a data or look up table. The correct volumetric efficiency point based on a corresponding one or more of the vehicle condition(s) may be looked up in the data table and applied as the initial pump volumetric efficiency to calculate an updated pump volumetric efficiency. It is noted that using the initial pump volumetric efficiency is not intended to be limited to only being used once per lowering operation. That is, the initial pump volumetric efficiency may be used in generating an updated pump volumetric efficiency for several implementations of the above equation. For example, the initial pump volumetric efficiency may be used in generating an updated pump volumetric efficiency for a predefined time period, such as, for example, the first 0.5 seconds after a lowering operation is commenced.

The second threshold speed may comprise a fixed speed, such as 300 feet/minute. When the fork carriage apparatus 300 is moving at a speed equal to or greater than 300 feet/minute, it is presumed to be moving at an unintended, excessive speed.

Figure 10A:
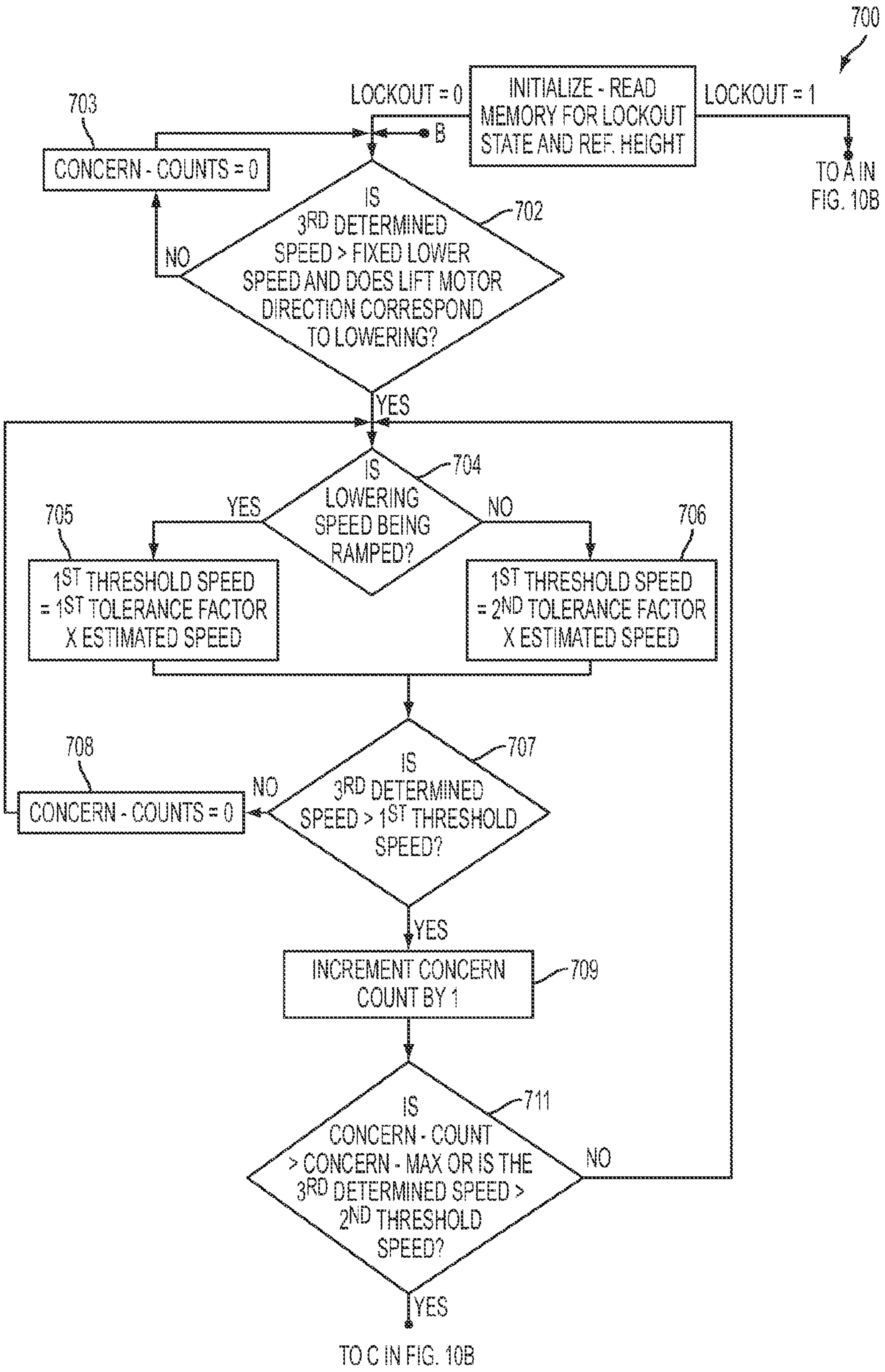
FIGS. 10A and 10B provide a flow chart illustrating process steps implemented by a controller in accordance with the present invention.
Figure 10B:
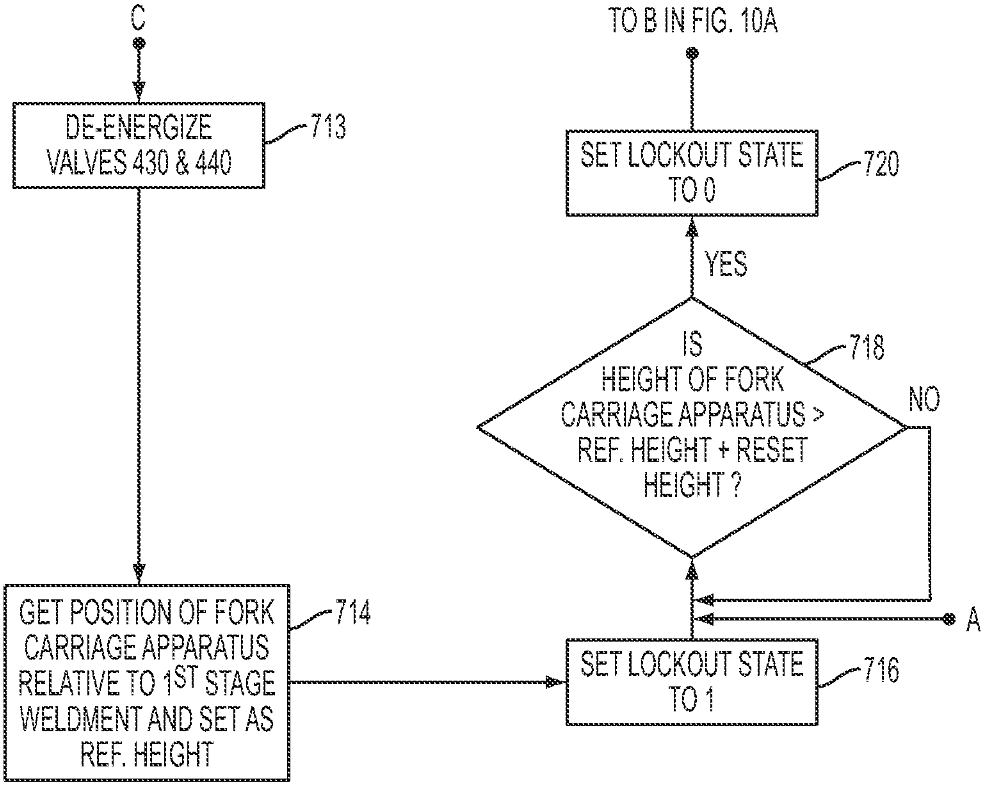

Referring to FIGS. 10A and 10B, a flow chart illustrates a process 700 implemented by the controller 1500 for controlling the operation of the first and second electronic normally closed proportional solenoid-operated valves 430 and 440 during a lowering command. At step 701, when the vehicle 100 is powered-up, the controller 1500 reads non-volatile memory (not shown) associated with the controller 1500 to determine a value stored within a first "lockout" memory location. If, during previous operation of the vehicle 100, the controller 1500 determined that a "concern-count," to be discussed below, exceeded a "concern-max" count, e.g., 40, the controller 1500 will have set the value in the first lockout memory location to 1. If not, the value in the first lockout memory location would remain set at 0.

If the controller 1500 determines during step 701 that the value in the first lockout memory location is 0, the controller 1500 next determines, during step 702, if the magnitude of the third determined speed is greater than a fixed lower threshold speed, e.g., 60 feet/minute, and whether the direction of movement of the lift motor 301, as indicated by the velocity sensor (noted above) associated with the motor 301, indicates that the fork carriage apparatus 300 is being lowered. If the answer to either or both of these queries is NO, then the "concern-count" value is set equal to 0, see step 703, and the controller 1500 returns to step 702. Step 702 may be continuously repeated once every predetermined time period, e.g., every 5 milliseconds. If the answer to both queries is YES, then the controller 1500 determines, in step 704, if an operator commanded lowering speed for the fork carriage apparatus 300 is being ramped, i.e., the ramping function is still being executed. If the answer is YES, then the first tolerance factor is used and the first threshold speed is equal to the estimated speed of the fork carriage apparatus 300 relative to the first weldment 230 times the first tolerance factor, see step 705. If the answer is NO, then the second tolerance factor is used and the first threshold speed is equal to the estimated speed of the fork carriage apparatus 300 relative to the first weldment 230 times the second tolerance factor, see step 706.

After the first threshold speed has been calculated, the controller 1500 determines, during step 707, whether the third determined speed is greater than the first threshold speed. If NO, the controller 1500 sets the "concern-count" value to 0 and returns to step 704. If YES, i.e., the controller 1500 determines that the third determined speed exceeds the first threshold speed, the controller 1500 increments the "concern-count" by "1," see step 709. At step 711, the controller 1500 determines if the "concern-count" is greater than the "concern-max" count or whether the third determined speed is greater than the second threshold speed. If the answer to both queries is NO, then the controller 1500 returns to step 704. Steps 704 and 707 may be continuously repeated once every predetermined time period, e.g., every 5 milliseconds. If the answer to one or both queries is YES, then the controller 1500 implements a response routine, wherein the controller 1500 de-energizes the first and second electronic normally closed proportional solenoid-operated valves 430 and 440, see step 713. As noted above, the valves 430 and 440 may be closed over an extended time period, e.g., from about 0.3 second to about 1.0 second.

Once the valves 430 and 440 have been closed, the controller 1500 determines, based on pulses generated by the encoder units 600 and 602, the height of the fork carriage apparatus 300 relative to the first stage weldment 430 and defines that height in non-volatile memory as a first "reference height," see step 714. The controller 1500 also sets the value in the first lockout memory location to "1," see step 716, as an unintended descent fault has occurred. As long as the value in the first lockout memory location is set to 1, the controller 1500 will not allow the valves 430 and 440 to be energized such that they are opened to allow descent of the fork carriage apparatus 300. However, the controller 1500 will allow, in response to an operator-generated lift command, pressurized fluid to be provided to the cylinders 222A and 412, which fluid passes through the valves 430 and 440.

If, after an unintended descent fault has occurred and in response to an operator-generated command to lift the fork carriage apparatus 300, one or both of the rams 222A and 414 are unable to lift the fork carriage apparatus 300, then the value in the first lockout memory location remains set to 1. On the other hand, if, in response to an operator-generated command to lift the fork carriage apparatus 300, one or both of the rams 222A and 414 are capable of lifting the fork carriage apparatus 300 above the first reference height plus a first reset height, as indicated by signals generated by the encoder units 600 and 602, the controller 1500 resets the value in the first lockout memory location to 0, see steps 718 and 720. Thereafter, the controller 1500 returns to step 702 and, hence, will allow the valves 430 and 440 to be energized such that they can be opened to allow controlled descent of the fork carriage apparatus 300. Movement of the fork carriage apparatus 300 above the first reference height plus a first reset height indicates that the hydraulic system 401 is functional. The first reset height may have a value of 0.25 inch to about 4 inches.

If the controller 1500 determines during step 701 that the value in the first lockout memory location is 1, the controller 1500 continuously monitors the height of the fork carriage apparatus 300, via signals generated by the encoder units 600 and 602, to see if the fork carriage apparatus 300 moves above the first reference height, which had previously been stored in memory, plus the first reset height, see step 718.

Figure 11:
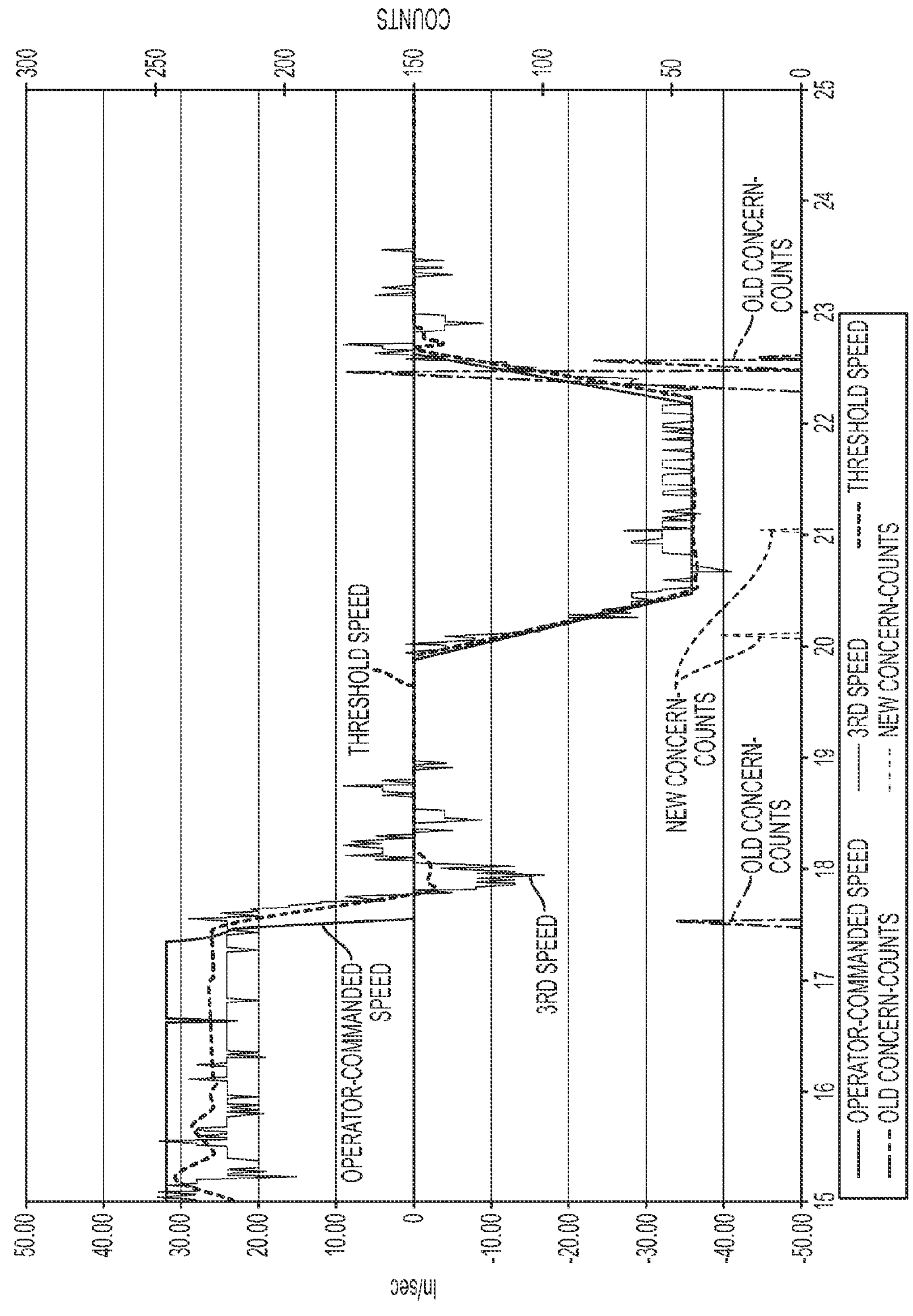
FIG. 11 is test data from a vehicle constructed in accordance with the present invention.

FIG. 11 illustrates data collected during operation of a vehicle constructed in accordance with the present invention. The data comprises an operator-commanded speed (as commanded via the multifunction controller 130), a third determined speed, i.e., a sensed speed of the fork carriage apparatus 300 relative to the first stage weldment 230, and a threshold speed. An estimated speed of the fork carriage apparatus 300 relative to the first stage weldment 230 was determined, wherein the estimated speed was calculated using the lift motor speed, as discussed above. The third determined speed was compared to the operator-commanded speed every 5 milliseconds. Also, the third determined speed was compared to the threshold speed every 5 milliseconds. The threshold speed was calculated by multiplying the estimated speed by 1.2. During each comparison event, when the third determined speed was greater than the operator-commanded speed, an "old concern-count" was incremented. Also during each comparison event, when the third determined speed was greater than the threshold speed, a "new concern-count" was incremented. When either the new concern count or the old concern count exceeded 50 counts, the controller 1500 implements a response routine, wherein the controller 1500 de-energized the first and second electronic normally closed proportional solenoid-operated valves 430 and 440. As is apparent from FIG. 11, the comparison between the third determined speed and the threshold speed resulted in zero events where the valves 430 and 440 were de-energized. However, the comparison between the third determined speed and the operator-commanded speed resulted in two events where the number of old concern-counts exceeded 50; hence, the controller 1500 de-energized the first and second valves 430 and 440. It is believed that the comparison of the third determined speed to the operator-commanded speed was less accurate than the comparison between the third determined speed with the threshold speed. This is believed to be because of inherent delays that occur in the vehicle from when an operator commands a fork carriage apparatus speed change via the multifunction controller 130 and pressurized fluid enters or exits the cylinders 222A and 412.

In the illustrated embodiment, during a lowering command, the controller 1500 compares a determined speed of the fork carriage apparatus 300 relative to the first stage weldment 230 to first and second threshold speeds. It is also contemplated that, during a lowering command, the controller 1500 may separately compare the first speed, i.e., the determined speed of the third stage weldment 250 relative to the first stage weldment 230, to the first and second threshold speeds and separately compare the second speed, i.e., the determined speed of the fork carriage apparatus 300 relative to the third stage weldment 250, to the first and second threshold speeds. During staging, it is contemplated that reduction of the first and second threshold speeds may be required. If the first determined speed is greater than the first threshold speed during a predefined number of sequential comparison events, e.g., between 1-50 comparison events, or greater than the second threshold speed during a single comparison event, then the electronic controller 1500 may de-energize the first and second electronic normally closed proportional solenoid-operated valves 430 and 440. If the second determined speed is greater than the first threshold speed during a predefined number of sequential comparison events, e.g., between 1-50 comparison events, or greater than the second threshold speed during a single comparison event, then the electronic controller 1500 may de-energize the first and second electronic normally closed proportional solenoid-operated valves 430 and 440.

The first threshold speed as calculated above may be used by the controller 1500 when comparing the first speed to the first threshold speed and the second speed to the first threshold speed.

Additionally, an electric current consumed or generated by the lift motor 301, i.e., an electric current flow into or out of the lift motor 301, may be monitored in accordance with an aspect of the invention. The monitored electric current flow into or out of the lift motor 301 may be used to change one or more operating parameters of the truck 100. For example, in some conditions, particularly with cold hydraulic fluid, it is possible that there is too much pressure drop in the hydraulic system 401 to allow the lift motor 301 to drive the hydraulic lift pump 302 at a speed at which the fork carriage apparatus 300 is lowered at a predetermined, desired lowering speed, e.g., 240 feet/minute. Specifically, the hydraulic lift pump 302 requires a minimum operating pressure to ensure that the hydraulic lift pump 302 is completely filled with hydraulic fluid, and is not rotating faster than it can fill with the hydraulic fluid, which may result in cavitation of the hydraulic fluid.

It has been determined that if the monitored electric current flow into or out of the lift motor 301 rises above a predetermined threshold value, the minimum operating pressure of the hydraulic lift pump 302 may not be met, which may be indicative of the hydraulic lift pump 302 rotating faster than it can fill with the hydraulic fluid and thus leading to cavitation of the hydraulic fluid, as noted above. When this condition is sensed, i.e., when the monitored electric current flow into or out of the lift motor 301 rises above the predetermined threshold value, the speed of the lift motor 301 is reduced until the electric current flow into or out of the lift motor 301 is back below the threshold value. Once the monitored electric current flow into or out of the lift motor 301 drops below the threshold value, the lift motor 301 can be adjusted back up to its normal operating speed. By monitoring the electric current flow into or out of the lift motor 301 and adjusting the operating speed of the lift motor 301, the cavitation of the hydraulic fluid in the hydraulic lift pump 302 can be prevented.

Figure 14:
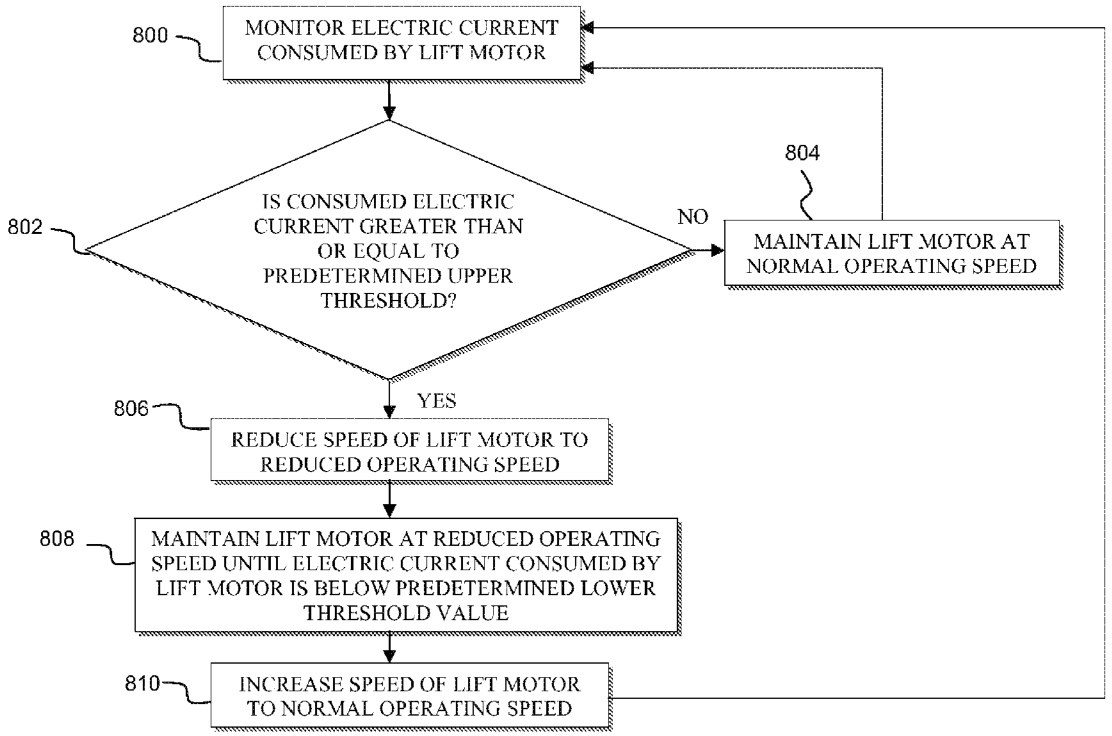
FIG. 14 provides a flow chart illustrating process steps implemented in accordance with the present invention.

FIG. 14 illustrates a flow chart for monitoring the electric current flow into or out of the lift motor 301 and adjusting an operating parameter of the truck 10 in accordance with an aspect of the invention. The steps may be carried out or implemented by the controller 1500, which controller 1500 may receive signals representative of the electric current flow into or out of the lift motor 301.

At step 800, the electric current flow into or out of the lift motor 301 is monitored. This step 800 may be implemented, for example, every 5 milliseconds, and may be implemented continuously during a lowering operation as described herein.

At step 802, it is determined whether the electric current flow into or out of the lift motor 301 is at or above a predetermined upper threshold value. In an exemplary embodiment in which the method is being employed in a regenerative lowering operation, the threshold value may be 0 amps, but may be other suitable values, or may be a percentage of a maximum or minimum current flow into or out of the lift motor 301.

If the electric current flow into or out of the lift motor 301 is determined at step 802 to be below the predetermined upper threshold value, the lift motor 301 is maintained at a normal operating speed at step 804. This cycle of steps 800-804 is repeated during a lowering operation until the electric current flow into or out of the lift motor 301 is determined to be at or above the predetermined upper threshold value.

If the electric current flow into or out of the lift motor 301 is determined at step 802 to be at or above the predetermined upper threshold value, the speed of the lift motor 301 is reduced at step 806 to a reduced operating speed. Reducing the speed of the lift motor 301 to the reduced operating speed causes a corresponding reduction in the rotating speed of the hydraulic lift pump 302. Step 806 is implemented to reduce or avoid cavitation of the hydraulic fluid in the hydraulic lift pump 302, as discussed above.

The lift motor 301 is maintained at the reduced operating speed at step 808 until the electric current flow into or out of the lift motor 301 is determined to be below a predetermined lower threshold value.

Upon the electric current flow into or out of the lift motor 301 dropping below the predetermined lower threshold value, the speed of the lift motor 301 is increased at step 810 back up to the normal operating speed.

Further, a pressure of the hydraulic fluid in the truck 100 may be monitored and compared with a threshold pressure $T_P$ in accordance with another aspect of the invention during the implementation of lifting and/or lowering commands, or during other vehicle operation procedures. The monitored pressure may be measured by a transducer $T_D$ (see FIG. 9) or other sensing structure located in hydraulic structure within the truck 100, i.e., within a component of the hydraulic system 401 or within the cylinder 222A of the mast weldment lift structure 220 or the cylinder 412 of the fork carriage apparatus lift structure 400. The transducer $T_D$ sends a signal to the controller 1500 that represents the measured pressure within the hydraulic structure.

The threshold pressure $T_P$ may comprise a variable that is dependent on one or more parameters, such as the height of a portion of the truck 10, e.g., a maximum lift height of the movable assembly, e.g., the maximum height of the tops of the forks 402, 404 relative to the ground, or a maximum height of the top of the third stage mast weldment 250 relative to the ground, and the weight of a load 250A that is carried on the forks 402, 404. According to one exemplary aspect of the invention, these values, i.e., the height of the truck portion and the weight of the load that is carried on the forks 402, 404, can be used to determine the threshold pressure $T_P$ according to the following equation:

$$T_P(\text{psi})=[A(\text{psi/pound})*\text{Load}(\text{pounds})]/100(\text{unitless})+[(\text{Height}(\text{inches})*100(\text{unitless})]/B(\text{inches/psi})$$

where $T_P$ is the threshold pressure (psi), A is a system gain defined by a numerical constant equal to 10 (psi/pound) in the illustrated embodiment, Load is the weight of the load carried on the forks 402, 404 (pounds), 100 is a unitless scaling factor, Height is the maximum lift height of the movable assembly (inches), 100 is a unitless scaling factor, and B is a system offset defined by a numerical constant equal to 600 (inches/psi) in the illustrated embodiment.

According to one aspect of the invention, the comparison of the monitored pressure of the hydraulic fluid in the hydraulic structure to the threshold pressure $T_P$ may be made by the controller 1500, e.g., when the truck 10 is implementing a lowering command or a lifting command, once every predefined time period, e.g., every 5 milliseconds. If the monitored pressure of the hydraulic fluid in the hydraulic structure falls below the threshold pressure $T_P$, it may be an indication that the hydraulic structure has lost its load-holding ability, e.g., as a result of a break in one of the fluid lines 411A-411C. If the monitored pressure of the hydraulic fluid in the hydraulic structure falls below the threshold pressure, the controller 1500 implements a response routine by de-energizing the first and second electronic normally closed proportional solenoid-operated valves 430 and 440 so as to prevent further downward movement of the rams 222B and 414. The controller 1500 may cause the first and second valves 430 and 440 to move from their powered open positions to their closed positions immediately or over an extended time period, such as from about 0.3 second to about 1.0 second. By causing the first and second valves 430 and 440 to close over an extended time period, the magnitude of pressure spikes within the cylinders 222A and 412, which occur when the pistons 222B and 414 stop their downward movement within the cylinders 222A and 412, is reduced. Further, closing of the first and second valves 430 and 440 by the controller 1500 may comprise partially closing the first and second valves 430 and 440, i.e., not fully closing the first and second valves 430 and 440, so as to allow the fork carriage apparatus 300 and the second and third stage weldments 240, 250 to lower slowly to the ground.

In one embodiment of the invention, so as to avoid false trips when the monitored pressure is compared to the threshold pressure $T_P$, the response routine is only implemented by the electronic controller 1500 if it is also determined that the fork carriage apparatus 300 is moving at a speed greater than a predetermined speed relative to the first stage weldment 230, wherein the speed of the fork carriage apparatus 300 relative to the first stage weldment may be determined as described in detail herein. The predetermined speed may be greater than or equal to about 90 feet/minute.

It is noted that the comparison of the monitored pressure of the hydraulic fluid in the hydraulic structure to the threshold pressure $T_P$ can be performed by the controller 1500 to implement a response routine in addition to or instead of one or more of the other comparisons described herein, such as the comparison of the determined or sensed speed of the fork carriage apparatus 300 relative to the first stage weldment 230 to the first and/or second threshold speeds and/or the comparison of the monitored electric current flow into or out of the lift motor 301 to the predetermined threshold (current) value.

Moreover, alternate response routines to the response routines previously described herein can be implemented by the controller 1500 if a comparison event, e.g., the comparison of the determined or sensed speed of the fork carriage apparatus 300 relative to the first stage weldment 230 to the first and/or second threshold speeds, the comparison of the monitored electric current flow into or out of the lift motor 301 to the predetermined threshold (current) value, and/or the comparison of the monitored pressure of the hydraulic fluid in the hydraulic structure to the threshold pressure $T_P$, yields an outcome that requires that a response routine be implemented. For example, the controller 1500 could initially implement a step decrease in electric current to the first and second electronic normally closed proportional solenoid-operated valves 430 and 440 to a level at or slightly above a breakout current. The breakout current is 250 milliamps in one embodiment of the invention and is the minimum current that will effect hydraulic fluid through the valve. The controller 1500 may then increase the current to the first and second electronic normally closed proportional solenoid-operated valves 430 and 440 in stepwise fashion to a level below a maximum commanded current. The maximum commanded current is 600 milliamps in one embodiment of the invention and is the current that fully opens the valves 430 and 440. The controller 1500 may then ramp the current to the first and second electronic normally closed proportional solenoid-operated valves 430 and 440 down to the breakout current over a time period of, for example, approximately 400 milliseconds. By causing the first and second valves 430 and 440 to close over an extended time period, the magnitude of pressure spikes within the cylinders 222A and 412, which occur when the first and second valves 430 and 440 are abruptly closed, is reduced. Further, controlling the first and second valves 430 and 440 in this manner, e.g., not fully closing the first and second valves 430 and 440 abruptly, improves response time and reduces oscillations in the fork carriage apparatus 300 that may otherwise occur as a result of a velocity fuse event, while allowing the fork carriage apparatus 300 and the second and third stage weldments 240, 250 to slow their descent to the ground in a controlled manner.

Figure 12:
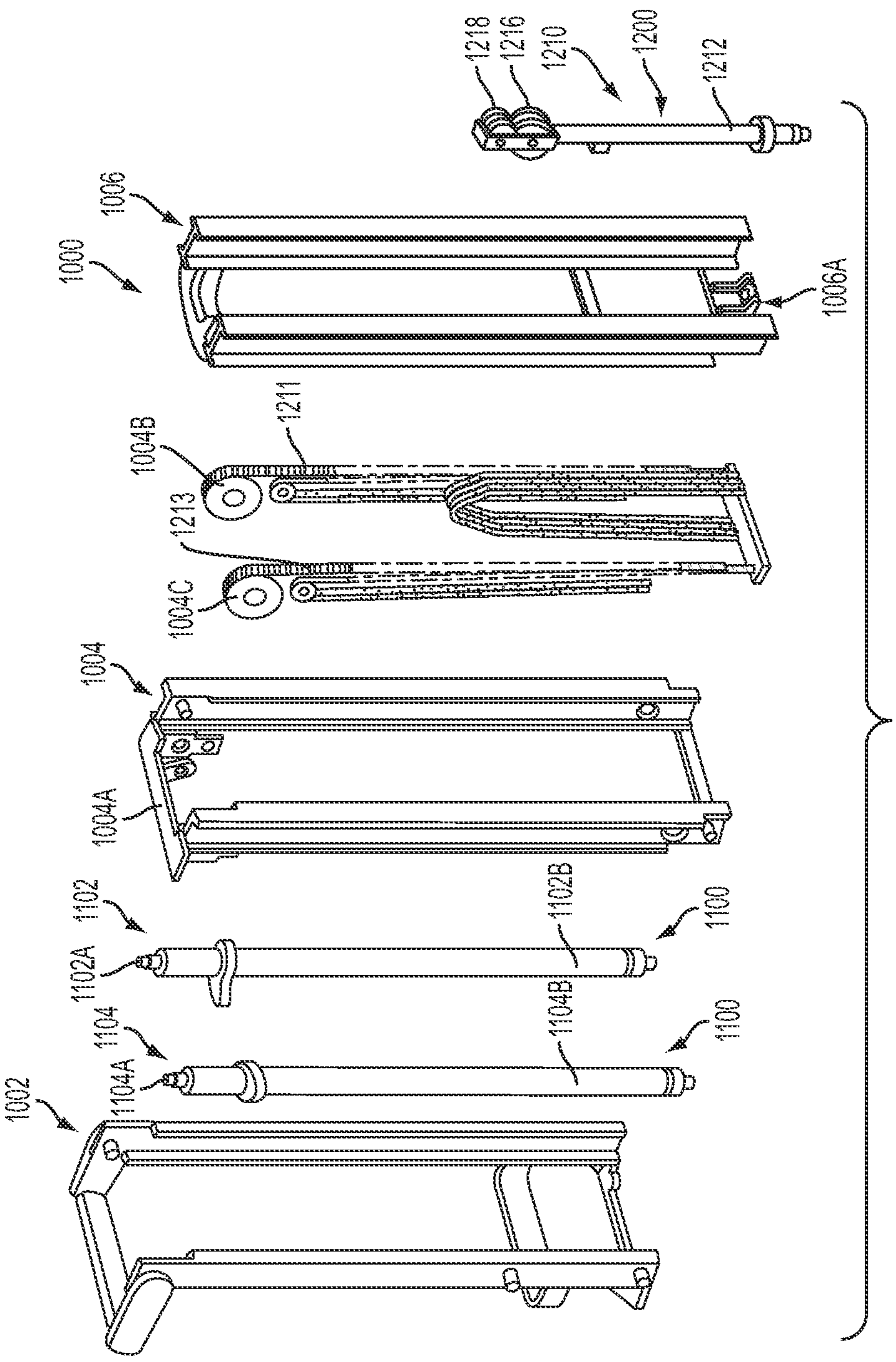
FIG. 12 is an exploded view of a mast assembly, a mast weldment lift structure and a fork carriage apparatus lift structure of a vehicle of a second embodiment of the present invention.

In accordance with a second embodiment of the present invention, a materials handling vehicle is provided comprising, for example, a stand-up counter balance truck or like vehicle, including a power unit (not shown), a mast assembly 1000, a mast weldment lift structure 1100, a fork carriage apparatus (not shown) and a fork carriage apparatus lift structure 1200, see FIG. 12. The mast assembly 1100 comprises, in the illustrated embodiment, first, second and third mast weldments 1002, 1004 and 1006, see FIG. 12, wherein the second weldment 1004 is nested within the first weldment 1002 and the third weldment 1006 is nested within the second weldment 1004. The first weldment 1002 is fixed to the vehicle power unit. The second or intermediate weldment 1004 is capable of vertical movement relative to the first weldment 1002. The third or inner weldment 1006 is capable of vertical movement relative to the first and second weldments 1002 and 1004.

The mast weldment lift structure 1100 comprises first and second lift ram/cylinder assemblies 1102 and 1104, which are fixed at their cylinders 1102B and 1104B to the first weldment 1002, see FIG. 12. Rams 1102A and 1104A extending from the cylinders 1102B and 1104B are fixed to an upper brace 1004A of the second weldment 1004.

A first chain 1211 is fixed to the cylinder 1102B of the first ram/cylinder assembly 1102 and a second chain 1213 is fixed to the cylinder 1104B of the second ram/cylinder assembly 1104. The first chain 1211 extends over a first pulley 1004B coupled to an upper end of the second mast weldment 1004 and is coupled to a lower portion 1006A of the third weldment 1006, see FIG. 12. The second chain 1213 extends over a second pulley 1004C coupled to an upper end of the second mast weldment 1004 and is also coupled to the third weldment lower portion 1006A. When the rams 1102A and 1104A of the assemblies 1102 and 1104 are extended, the rams 1102A and 1104A lift the second weldment 1004 vertically relative to the fixed first weldment 1002. Further, the first and second pulleys 1004B and 1004C fixed to an upper end of the second weldment 1004 apply upward forces on the chains 1211 and 1213 causing the third weldment 1006 to move vertically relative to the first and second weldments 1002 and 1004. For every one unit of vertical movement of the second weldment 1004, the third weldment 1006 moves vertically two units.

The fork carriage apparatus comprises a pair of forks (not shown) and a fork carriage mechanism upon which the forks are mounted. The fork carriage mechanism may be mounted for reciprocal movement directly to the third mast weldment 1006. Alternatively, the fork carriage mechanism may be mounted to a reach mechanism (not shown), which is mounted to a mast carriage assembly (not shown), which is mounted for reciprocal movement to the third mast weldment 1006.

Figure 13:
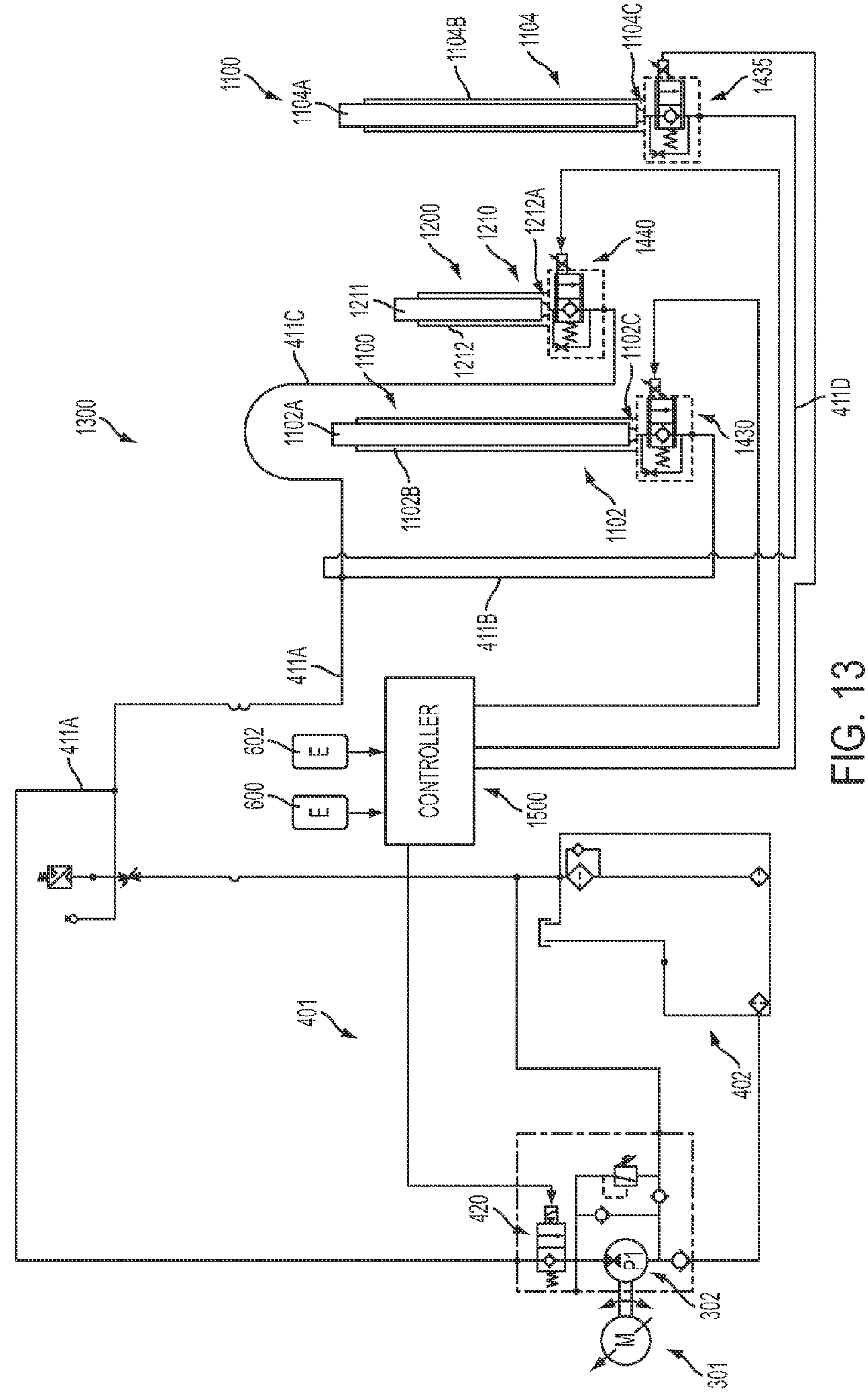
FIG. 13 is a schematic diagram illustrating the motor, pump, controller, electronic normally closed ON/OFF solenoid-operated valve, first, second and third electronic normally closed proportional solenoid-operated valves, mast weldment lift structure and fork carriage apparatus lift structure of the vehicle of the second embodiment of the present invention.

The fork carriage apparatus lift structure 1200 is coupled to the third weldment 1006 and the fork carriage apparatus to effect vertical movement of the fork carriage apparatus relative to the third weldment 1006. The lift structure 1200 includes a ram/cylinder assembly 1210 comprising a cylinder 1212 fixed to the third mast weldment 1006 such that it moves vertically with the third weldment 1006. A ram 1211, see FIG. 13, is associated with the cylinder 1212 and is capable of extending from the cylinder 1212 when pressurized hydraulic fluid is provided to the cylinder 1212. Third and fourth pulleys 1216 and 1218 are coupled to an upper end of the ram 1211, see FIG. 12. A pair of lift chains (not shown) are fixed at one end to the cylinder 1212, extend over the third pulley 1216 and are coupled to a lower portion (not shown) of the fork carriage apparatus. When pressurized fluid is provided to the cylinder 1212, its ram 1211 is extended causing the pulley 1216 to move vertically relative to the third weldment 1006. Vertical movement of the pulley 1216 causes the lift chains to raise the fork carriage assembly relative to the third weldment 1006.

The materials handling vehicle of the second embodiment includes a hydraulic system 1300 as illustrated in FIG. 13, wherein elements that are the same as those illustrated in FIG. 9 are referenced by the same reference numerals. The hydraulic system 1300 comprises a lift motor 301, which drives a hydraulic lift pump 302. The pump 302 supplies pressurized hydraulic fluid to the mast weldment lift structure 1100 comprising the first and second lift ram/cylinder assemblies 1102 and 1104 and the fork carriage apparatus lift structure 1200 comprising the ram/cylinder assembly 1210.

The hydraulic system 1300 further comprises a hydraulic fluid reservoir 402, which is housed in the power unit, and fluid hoses/lines 411A-411D coupled between the pump 302 and the mast weldment lift structure 1100 comprising the first and second lift ram/cylinder assemblies 1102 and 1104 and the fork carriage apparatus lift structure 1200 comprising the ram/cylinder assembly 1210. The fluid hoses/lines 411A and 411B are coupled in series and function as supply/return lines between the pump 302 and the mast weldment structure first hydraulic ram/cylinder assembly 1102. The fluid hoses/lines 411A and 411C are coupled in series and function as supply/return lines between the pump 302 and the fork carriage apparatus lift structure hydraulic ram/cylinder assembly 1210. The fluid hoses/lines 411A and 411D are coupled in series and function as supply/return lines between the pump 302 and the mast weldment structure second hydraulic ram/cylinder assembly 1104. Because the fluid hose/line 411A is directly coupled to the fluid hoses/lines 411B-411D, all four lines 411A-411C are always at the substantially the same fluid pressure.

The hydraulic system 401 also comprises an electronic normally closed ON/OFF solenoid-operated valve 420 and first, second and third electronic normally closed proportional solenoid-operated valves 1430, 1435 and 1440. The valves 1420, 1430, 1435 and 1440 are coupled to an electronic controller 1500 for controlling their operation, see FIG. 13. The electronic controller 1500 forms part of a "control structure." The normally closed ON/OFF solenoid valve 420 is energized by the controller 1500 only when one or more of the rams 1211, 1102A and 1104A are to be lowered. When de-energized, the solenoid valve 420 functions as a check valve so as to block pressurized fluid from flowing from line 411A, through the pump 302 and back into the reservoir 402, i.e., functions to prevent downward drift of the fork carriage apparatus, yet allows pressurized fluid to flow to the cylinders 1212, 1102B and 1104B via the lines 411A-411D during a lift operation.

The first electronic normally closed proportional solenoid-operated valve 1430 is located within and directly coupled to a base 1102C of the cylinder 1102B of the mast weldment lift structure first hydraulic ram/cylinder assembly 1102, see FIG. 13. The second electronic normally closed proportional solenoid-operated valve 1435 is located within and directly coupled to a base 1104C of the cylinder 1104B of the mast weldment lift structure second hydraulic ram/cylinder assembly 1104. The third electronic normally closed proportional solenoid-operated valve 1440 is located within and directly coupled to a base 1212A of the cylinder 1212 of the fork carriage apparatus lift structure hydraulic ram/cylinder assembly 1200. The first and second normally closed proportional solenoid-operated valves 1430 and 1435 are energized, i.e., opened, by the controller 1500 when the rams 1102A and 1104A are to be lowered. The third normally closed proportional solenoid-operated valve 1440 is energized, i.e., opened, by the controller 1500 when the ram 1211 is to be lowered. When de-energized, the first, second and third normally closed proportional solenoid-operated valves 1430, 1435 and 1440 function as check valves so as to block pressurized fluid from flowing out of the cylinders 1102B, 1104B and 1212. The valves 1430, 1435 and 1440, when functioning as check valves, also permit pressurized hydraulic fluid to flow into the cylinders 1102B, 1104B and 1212 during a lift operation.

When a lift command is generated by an operator via a multifunction controller, the cylinder 1212 of the fork carriage apparatus lift structure 1200 and the cylinders 1102B and 1104B of the mast weldment lift structure 1100 are exposed to hydraulic fluid at the same pressure via the lines 411A-411D. The ram 1211 of the fork carriage apparatus lift structure 1200 has a base end with a cross sectional area and each of the rams 1102A and 1104A of the mast weldment lift structure 1100 includes a base end having a cross sectional area equal to about ½ of the cross sectional area of the ram 1211 of the fork carriage apparatus lift structure 1200. Hence, the combined cross sectional areas of the rams 1102A and 1104A equals the cross sectional area of the ram 1211. As a result, for all load conditions, the fork carriage apparatus lift structure 1200 requires less pressure to actuate than the mast weldment lift structure 1100. As a result, the ram 1211 of the fork carriage apparatus lift structure 1200 will move first until the fork carriage apparatus has reached its maximum height relative to the third stage weldment 1006. Thereafter, the second and third stage weldments 1004 and 1006 will begin to move vertically relative to the first stage weldment 1002.

When a lowering command is generated by an operator via the multifunction controller 130, the electronic controller 1500 causes the electronic normally closed ON/OFF solenoid-operated valve 420 to open. Presuming the rams 1211, 1102A and 1104A are fully extended when a lowering command is generated, the first and second proportional valves 1430 and 1435 are energized by the controller 1500, causing them to fully open in the illustrated embodiment to allow fluid to exit the cylinders 1102B and 1104B of the mast weldment lift structure 1100, thereby allowing the second and third stage weldments 1004 and 1006 to lower. Once the second and third stage weldments 1004 and 1006 near their lowermost positions, the controller 1500 causes the third proportional valve 1440 to substantially fully open and the first and second proportional valves 1430 and 1435 to partially close. Partially closing the first and second valves 1430 and 1435 causes the fluid pressure in the lines 411A-411D to lower. By opening the third valve 1440 and partially closing the first and second valves 1430 and 1435, the ram 1211 begins to lower, while the rams 1102A and 1104A continue to lower. After the rams 1102A and 1104A reach their lowermost position, the ram 1211 continues to lower until the fork carriage apparatus reaches its lowermost position.

First and second encoder units 600 and 602, respectfully, also forming part of the "control structure," are provided and may comprise conventional friction wheel encoder assemblies or conventional wire/cable encoder assemblies, see FIG. 13. In the illustrated embodiment, the first encoder unit 600 comprises a first friction wheel encoder assembly mounted to the third stage weldment 1006 such that a first friction wheel engages and moves along the second stage weldment 1004. Hence, as the third stage weldment 1006 moves relative to the second stage weldment 1004, the first friction wheel encoder generates pulses to the controller 1500 indicative of the third stage weldment movement relative to the second stage weldment.

Also in the illustrated embodiment, the second encoder unit 602 comprises a second friction wheel assembly mounted to the fork carriage apparatus such that a second friction wheel engages and moves along the third mast stage weldment 1006. Hence, as the fork carriage apparatus moves relative to the third stage weldment 1006, the second friction wheel encoder generates pulses to the controller 1500 indicative of the fork carriage apparatus movement relative to the third stage weldment 1006.

As noted above, the first and second encoder units 600 and 602 generate corresponding pulses to the controller 1500. The pulses generated by the first encoder unit 600 are used by the controller 1500 to determine the position of the third stage weldment 1006 relative to the second stage weldment 1004 as well as the speed of movement of the third stage weldment 1006 relative to the second stage weldment 1004. Using this information, the controller 1500 determines the speed and position of the third stage weldment 1006 relative to the fixed first stage weldment 1002. The pulses generated by the second encoder unit 602 are used by the controller 1500 to determine the position of the fork carriage apparatus relative to the third mast stage weldment 1006 as well as the speed of movement of the fork carriage apparatus relative to the third mast stage weldment 1006. By knowing the speed and position of the third stage weldment 1006 relative to the first stage weldment 1002 and the speed and position of the fork carriage apparatus relative to the third stage weldment 1006, the controller 1500 can easily determine the speed and position of the fork carriage apparatus relative to the first stage weldment 1002.

In accordance with the present invention, during a lowering command, the controller 1500 compares a determined or sensed speed of the fork carriage apparatus relative to the first stage weldment 230 to first and second threshold speeds. This involves the controller 1500 determining a first speed comprising a determined or sensed speed of the third stage weldment 1006 relative to the first stage weldment 1002, determining a second speed comprising a determined or sensed speed of the fork carriage apparatus relative to the third stage weldment 1006 and adding the first and second determined speeds together to calculate a third determined speed. The third determined speed is equal to the determined or sensed speed of the fork carriage apparatus relative to the first stage weldment 1002.

As noted above, for every one unit of vertical movement of the second stage weldment 1004 relative to the first stage weldment 1002, the third stage weldment 1006 moves vertically two units relative to the first stage weldment 1002. In order to determine the first speed, the controller 1500 determines the speed of third stage weldment 1006 relative to the second stage weldment 1004 using the pulses from the first encoder unit 600, as noted above, and multiplies the determined speed of movement of the third stage weldment 1006 relative to the second stage weldment 1004 by "2". Hence, this provides the first speed, i.e., the speed of the third stage weldment 1006 relative to the first stage weldment 1002.

The second speed is equal to the determined speed of movement of the fork carriage apparatus relative to the third mast stage weldment and is found using the pulses generated by the second encoder unit 602 as noted above.

During a lowering command, the controller 1500 may compare the third determined speed, i.e., the determined speed of the fork carriage apparatus relative to the first stage weldment 1002, to the first and second threshold speeds. In the illustrated embodiment, the comparison of the third determined speed to the first and second threshold speeds may be made by the controller 1500 once every predefined time period, e.g., every 5 milliseconds. The comparison of the third determined speed to the first and second threshold speeds is referred to herein as a "comparison event." If the third determined speed is greater than the first threshold speed during a predefined number of sequential comparison events, e.g., between 1-50 comparison events, or greater than the second threshold speed during a single comparison event, then the electronic controller 1500 implements a response routine, wherein the controller 1500 de-energizes the first, second and third electronic normally closed proportional solenoid-operated valves 1430, 1435 and 1440 so as to prevent further downward movement of the rams 1102A, 1104A and 1211. The controller 1500 may cause the first, second and third valves 1430, 1435 and 1440 to move from their powered open positions to their closed positions immediately or over an extended time period, such as from about 0.3 second to about 1.0 second. Further, as discussed above, the valves 1430, 1435 and 1440 could only be partially closed so as to allow the fork carriage apparatus and the second and third stage weldments 1004, 1006 to lower slowly to the ground. It is presumed that when the third determined speed is greater than one of the first and second threshold speeds, the fork carriage apparatus is moving too quickly relative to the first stage weldment 1002, i.e., at an unintended descent speed, which condition may occur when there is a loss of hydraulic pressure in the fluid being metered from one or more of the cylinders 1102B, 1104B and 1212. Loss of hydraulic pressure may be caused by a breakage in one of the fluid lines 411A-411D.

The first threshold speed may be determined by the electronic controller 1500 as follows. First, the controller 1500 may estimate a combined speed of the rams 1102A, 1104A of the mast weldment lift structure 1100 and the ram 1211 of the fork carriage apparatus lift structure 1200 from a speed of the lift motor 301. As discussed above, with respect to a lowering operation with the fork carriage apparatus and the second and third stage weldments 1004 and 1006 fully extended, the rams 1102A and 1104A begin to lower first, then the rams 1102A, 1104A and 1211 lower simultaneously during a staging part of the lowering operation until the rams 1102A and 1104A reach their lowermost position. Thereafter, the ram 1211 continues its downward movement until it reaches its lowermost position.

First, the controller 1500 converts the lift motor speed into a lift pump fluid flow rate using the following equation:

pump fluid flow rate(gallons/minute)=[(lift motor speed(RPM))*(lift pump displacement(cc/revolution))*(lift motor volumetric efficiency)]/(3786 cc/gal)

The controller 1500 may then determine an estimated linear speed of the fork carriage apparatus relative to the first stage weldment 1002 using the following equation, which equation is believed to be applicable during all phases of a lowering operation, including staging when the rams 1102A and 1104A and ram 1211 are being lowered simultaneously:

estimated linear speed of the fork carriage apparatus relative to the first weldment 1002(inches/second)=[(pump fluid flow rate(gallons/minute))*(231 $in^3$/gallon)*(speed ratio)]/[(cylinder inside area($in^2$))*(60 seconds/minute)]

wherein,

"cylinder inside area"=summation of the cross sectional areas of cylinders 1102B and 1104B=the cross sectional area of cylinder 1212 (only the summation of the cross sectional areas of cylinders 1102B and 1104B or only the cross sectional area of cylinder 1212 is used in the equation);

"speed ratio"=(the third weldment speed/first weldment speed)=(fork carriage apparatus speed/third weldment speed)=2/1 in the illustrated embodiment.

In the illustrated embodiment, the first threshold speed is equal to the estimated speed of the fork carriage apparatus relative to the first weldment 1002 times either a first tolerance factor, e.g., 1.6, or a second tolerance factor, e.g., 1.2. As noted above with regards to the embodiment illustrated in FIG. 9, the first tolerance factor is used when the fork lowering speed is in the process of being ramped to the commanded speed, i.e., the controller 1500 is still executing a ramping function, and the second tolerance factor is used when the controller 1500 is no longer increasing the speed of the lift motor 301, i.e., the controller 1500 has completed the ramping function.

As noted above, the controller 1500 may use the determined downward speed of the fork carriage apparatus relative to the first stage weldment, the estimated fork carriage apparatus downward speed relative to the first weldment and the current pump volumetric efficiency to generate an updated pump volumetric efficiency, which updated pump volumetric efficiency may be used by the controller 1500 the next time it converts lift motor speed into a lift pump fluid flow rate. Or, as noted above, the controller 1500 may use the initial pump volumetric efficiency, i.e., a predefined stored initial pump volumetric efficiency or an appropriate volumetric efficiency point that corresponds to one or more vehicle conditions, e.g., speed, hydraulic fluid pressure, temperature, and/or viscosity, direction of rotation of the hydraulic lift pump 302, etc., stored in a data or look up table, the next time it converts lift motor speed into a lift pump fluid flow rate.

The second threshold speed may comprise a fixed speed, such as 300 feet/minute.

The process 700 set out in FIGS. 10A and 10B may be used the controller 1500 for controlling the operation of the first, second and third electronic normally closed proportional solenoid-operated valves 1430, 1435 and 1440 during a lowering command, with the following modifications being made to the process.

At step 711, the controller 1500 determines if the "concern-count" is greater than the "concern-max" count or whether the third determined speed is greater than the second threshold speed. If the answer to one or both queries is YES, then the controller 1500 implements a response routine, wherein the controller 1500 de-energizes the first, second and third electronic normally closed proportional solenoid-operated valves 1430, 1435 and 1440.

Once the valves 1430, 1435 and 1440 have been closed, the controller 1500 determines, based on pulses generated by the encoder units 600 and 602, the height of the fork carriage apparatus relative to the first stage weldment 1002 and defines that height in non-volatile memory as a first "reference height," see step 714. The controller 1500 also sets the value in the first lockout memory location to "1," see step 716, as an unintended descent fault has occurred. As long as the value in the first lockout memory location is set to 1, the controller 1500 will not allow the valves 1430, 1435 and 1440 to be energized such that they are opened to allow descent of the fork carriage apparatus. However, the controller 1500 will allow, in response to an operator-generated lift command, pressurized fluid to be provided to the cylinders 1102B, 1104B and 1212, which fluid passes through the valves 1430, 1435 and 1440.

If, after an unintended descent fault has occurred and in response to an operator-generated command to lift the fork carriage apparatus, one or more of the rams 1102A, 1104A and 1211 are unable to lift the fork carriage apparatus, then the value in the first lockout memory location remains set to 1. On the other hand, if, in response to an operator-generated command to lift the fork carriage apparatus, one or more of the rams 1102A, 1104A and 1211 are capable of lifting the fork carriage apparatus above the first reference height plus a first reset height, as indicated by signals generated by the encoder units 600 and 602, the controller 1500 resets the value in the first lockout memory location to 0, see steps 718 and 720. Thereafter, the controller 1500 returns to step 702 and, hence, will allow the valves 1430, 1435 and 1440 to be energized such that they can be opened to allow controlled descent of the fork carriage apparatus. Movement of the fork carriage apparatus above the first reference height plus a first reset height indicates that the hydraulic system 1300 is functional.

If the controller 1500 determines during step 701 that the value in the first lockout memory location is 1, the controller 1500 continuously monitors the height of the fork carriage apparatus, via signals generated by the encoder units 600 and 602, to see if the fork carriage apparatus moves above the first reference height plus the first reset height, see step 718.

It is further contemplated that the monomast 200 illustrated in FIG. 1 may comprise only a first fixed mast weldment and a second movable mast weldment and the mast assembly 1000 illustrated in FIG. 12 may include only a first fixed mast weldment and a second movable mast weldment.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A materials handling vehicle comprising:

a support structure including a fixed member;

a movable assembly coupled to said support structure;

said support structure further comprising lift apparatus to effect movement of said movable assembly relative to said support structure fixed member, said lift apparatus including at least one ram/cylinder assembly;

a hydraulic system including a motor, a pump coupled to said motor to supply a pressurized fluid to said at least one ram/cylinder assembly, and at least one electronically controlled valve associated with said at least one ram/cylinder assembly; and control structure to estimate a speed of said movable assembly from a speed of said motor and to calculate an updated pump volumetric efficiency using a comparison involving the estimated movable assembly speed and a determined movable assembly speed, wherein the comparison does not involve use of an operator commanded speed.

2. The materials handling vehicle as set forth in claim 1, wherein said control structure determines the updated volumetric efficiency using the following equation:

updated volumetric efficiency=(determined movable assembly speed*current volumetric efficiency)/estimated movable assembly speed.

3. The materials handling vehicle as set forth in claim 2, wherein the current volumetric efficiency is derived based on one or more of a speed of the materials handling vehicle, a direction of rotation of the pump, and a pressure, a temperature, and/or a viscosity of the pressurized fluid.

4. The materials handling vehicle as set forth in claim 1, wherein said fixed member comprises a fixed mast weldment coupled to a power unit.

5. The materials handling vehicle as set forth in claim 1, wherein said lift apparatus comprises at least one movable mast weldment and said movable assembly comprises a fork carriage assembly which moves relative to said support structure fixed member.

6. The materials handling vehicle as set forth in claim 1, wherein said control structure further measures an electric current flow into or out of said hydraulic system motor and reduces an operating speed of said hydraulic system motor if the electric current flow into or out of said hydraulic system motor is greater than or equal to a predetermined threshold value.

7. The materials handling vehicle as set forth in claim 1, wherein said control structure further controls the operation of said at least one valve using the comparison of the estimated movable assembly speed to the determined movable assembly speed.

8. The materials handling vehicle as set out in claim 7, wherein said control structure is capable of energizing said at least one valve so as to open said at least one valve to permit said movable assembly to be lowered in a controlled manner to a desired position relative to said support structure fixed member.

9. The materials handling vehicle as set forth in claim 8, wherein said control structure de-energizes said at least one valve in response to an operator-generated command to cease further descent of said movable assembly relative to said support structure fixed member.

10. The materials handling vehicle as set forth in claim 9, wherein said at least one valve functions as a check valve when de-energized so as to block pressurized fluid from flowing out of said at least one ram/cylinder assembly, and allows pressurized fluid to flow into said at least one ram/cylinder assembly during a movable assembly lift operation.

11. The materials handling vehicle as set forth in claim 7, wherein:

said support structure further comprises a power unit;

said support structure fixed member comprises a fixed first mast weldment coupled to said power unit;

said lift apparatus comprises:

a second mast weldment movable relative to said first mast weldment; and a third mast weldment movable relative to said first and second mast weldments;

said at least one ram/cylinder assembly comprises:

at least one first ram/cylinder assembly coupled between said first and second mast weldments for effecting movement of said second and third mast weldments relative to said first mast weldment; and a second ram/cylinder assembly coupled between said third mast weldment and said movable assembly so as to effect movement of said movable assembly relative to said third mast weldment; and said at least one electronically controlled valve comprises:

at least one first solenoid-operated, normally closed, proportional valve associated with said at least one first ram/cylinder assembly; and a second solenoid-operated, normally closed, proportional valve associated with said second ram/cylinder assembly.

12. The materials handling vehicle as set forth in claim 11, wherein said control structure comprises:

encoder apparatus associated with said movable assembly for generating encoder pulses as said movable assembly moves relative to said first mast weldment; and a controller coupled to said encoder apparatus and said valves for receiving said encoder pulses generated by said encoder apparatus, and determining the determined movable assembly speed based on the encoder pulses.

13. The materials handling vehicle as set out in claim 12, wherein said controller controls the operation of said at least one first valve and said second valve by comparing the determined movable assembly speed with at least one of:

a first threshold speed based on the estimated movable assembly speed; and the first threshold speed and a fixed, second threshold speed.

14. The materials handling vehicle as set out in claim 13, wherein said controller functions to de-energize said at least one first valve and said second valve causing them to move from their powered open state to their closed state in the event said movable assembly moves downwardly at the determined movable assembly speed in excess of one of the first and second threshold speeds.

15. The materials handling vehicle as set forth in claim 14, wherein said controller slowly closes said at least one first valve and said second valve in the event said movable assembly moves downwardly at a speed in excess of said first or said second threshold speed.

16. The materials handling vehicle as set forth in claim 15, wherein said controller causes said at least one first valve and said second valve to move from their powered open position to their closed position over a time period of from about 0.3 second to about 1.0 second.

17. The materials handling vehicle as set out in claim 13, wherein said controller functions to deenergize said first and second valves causing them to move from their powered open state to a partially closed state in the event said movable assembly moves downwardly at the determined movable assembly speed in excess of one of the first and second threshold speeds.

18. The materials handling vehicle as set out in claim 7, wherein said control structure deenergizes said at least one valve causing it to move from a powered open state to a partially closed state in the event said movable assembly moves downwardly at an unintended descent speed.

19. The materials handling vehicle as set out in claim 18, wherein said movable assembly moves downwardly at an unintended descent speed when the determined movable assembly speed is in excess of a first threshold speed based on the estimated movable assembly speed.

20. The materials handling vehicle as set forth in claim 1, wherein said control structure estimates the movable assembly speed from the motor speed by: converting motor speed into a pump fluid flow rate, converting the pump fluid flow rate into a ram speed and converting the ram speed into the estimated movable assembly speed.

21. The materials handling vehicle as set forth in claim 1, wherein said at least one valve comprises a solenoid-operated, normally closed, proportional valve.

22. The materials handling vehicle as set forth in claim 1, wherein said at least one valve is positioned in a base of said at least one ram/cylinder assembly.

23. The materials handling vehicle as set forth in claim 1, wherein said hydraulic system motor receives power from a battery for driving said hydraulic system pump.

* * * * *

UNITED STATES PATENT AND TRADEMARK OFFICE

CERTIFICATE OF CORRECTION

PATENT NO. : 8,924,103 B2
APPLICATION NO. : 14/333895
DATED : December 30, 2014
INVENTOR(S) : Dammeyer et al.

It is certified that error appears in the above-identified patent and that said Letters Patent is hereby corrected as shown below:

On the title page:

Item [75] Second Inventor Eric D. Holbrook's city delete "Findley", should read --Findlay--.

Signed and Sealed this
Third Day of March, 2015

Michelle K. Lee

Michelle K. Lee
*Deputy Director of the United States Patent and Trademark Office*